United States Patent [19]
Delumeau

[11] Patent Number: 6,108,344
[45] Date of Patent: Aug. 22, 2000

[54] METHOD, MEANS AND SYSTEM FOR COMMUNICATING ON A SHARED TRANSMISSION MEDIUM

[75] Inventor: François Delumeau, Rennes, France

[73] Assignee: Canon Kabushiki Kaisha, Tokyo, Japan

[21] Appl. No.: 08/787,051

[22] Filed: Jan. 28, 1997

[30] Foreign Application Priority Data

Jan. 31, 1996 [FR] France .................................. 96 01127

[51] Int. Cl.[7] .............................................. H04L 12/413
[52] U.S. Cl. .......................................................... 370/445
[58] Field of Search .................................... 370/254, 252, 370/445, 447, 448, 453, 461, 482; 455/8, 9, 103, 528, 500

[56] References Cited

U.S. PATENT DOCUMENTS

| | | | |
|---|---|---|---|
| 4,495,493 | 1/1985 | Segarra et al. | 340/825.5 |
| 5,086,451 | 2/1992 | Saegusa et al. | 455/560 |
| 5,157,667 | 10/1992 | Carusone, Jr. et al. | 714/45 |
| 5,231,634 | 7/1993 | Giles et al. | 370/445 |
| 5,274,841 | 12/1993 | Natarajun et al. | 370/445 |
| 5,299,194 | 3/1994 | Ichii et al. | 370/445 |
| 5,339,313 | 8/1994 | Ben-Michael et al. | 370/445 |
| 5,343,474 | 8/1994 | Driscoll | 370/461 |
| 5,422,887 | 6/1995 | Diepstraten et al. | 370/448 |
| 5,682,381 | 10/1997 | Sekihata et al. | 370/445 |
| 5,710,979 | 1/1998 | Tamai | 455/67.1 |

FOREIGN PATENT DOCUMENTS

| | | |
|---|---|---|
| 0256463 | 2/1988 | European Pat. Off. . |
| 0483546 | 5/1992 | European Pat. Off. . |
| 9501020 | 1/1995 | WIPO . |

OTHER PUBLICATIONS

IEEE Proc., Sec. E, vol. 134, No. 1, Jan. 1987, pp. 54–60, Koubias et al., "Analysis of an adaptive multiple–access protocol (ATP–1) with mixed structure."

Primary Examiner—Ajit Patel
Attorney, Agent, or Firm—Fitzpatrick, Cella, Harper & Scinto

[57] ABSTRACT

The present invention relates notably to a method for sharing a transmission medium between communication apparatuses having an identifier, each adapted on the one hand to transmit messages by device of the transmission medium, during so-called "transmission" phases, and/or on the other hand to receive messages by device of the transmission medium, during so-called "reception" phases. Each communication apparatus stores, in each reception phase, and associated with identifiers, activity states representing the last messages transmitted by the communication apparatuses having these identifiers, in their own transmission phases. In a so-called "transmission preparation" phase preceding each transmission phase, each communication apparatus determines, according to first predetermined rules taking into account at least certain of the said activity states, at what moment it can transmit a message on the transmission medium.

51 Claims, 10 Drawing Sheets

| (P) | (E) | (D) | (L) | (C) |

| |
|---|
| h |
| state |
| position |
| $N_H$ (1) |
| ... |
| $N_H$ (MAX_EQUIPMENT) |
| Down Counter (1) |
| ... |
| Down Counter (MAX_EQUIPMENT) |
| List_Size |
| Received_Sender |
| l_r |
| l_e |
| a |
| d |
| Transmission_Wait |
| Transmitted_Message |
| Received_Message |
| Unoccupied_Channel_Period |
| Occupied_Channel_Period |

FIG. 6A

| |
|---|
| MAX_EQUIPMENT |
| NMAX |
| Main_Prog |
| Analyse_Correct_Message |
| Analyse_Down_Counter |
| Prepare_L |
| Wait_for_Transmission |
| $T_{MIN}$ |
| $T_I$ |
| $T_S$ |
| $T_A$ |
| $T_N$ |

FIG. 6B

METHOD, MEANS AND SYSTEM FOR COMMUNICATING ON A SHARED TRANSMISSION MEDIUM

The present invention concerns a method and an apparatus for sharing a transmission medium between communication apparatuses.

More particularly, the invention proposes a method and an apparatus for resolving problems of access to the transmission medium shared by different communication apparatuses.

This invention finds a preferential application in the field of wireless data networks, in which the conventional methods for accessing the transmission medium, initially envisaged for accessing wired networks, lose some of their efficiency. Wireless networks actually have their own specificities, which considerably complicate access to the transmission medium. Unlike the wired network, the wireless network sometimes have difficulty to make communication apparatus more than one to receive the same information correctly when transmission medium is in trouble or the distance between the medium is too wide.

The document EP-A-0 483 546 in the prior art is known, which provides a method for accessing a multicellular wireless network through interrogation. The wireless network is here divided into cells, each cell consisting of a master station and one or more mobile stations. The cycle of communication within a cell is divided into two successive phases in the course of which the data are transmitted respectively from the mobile stations to the master station in the course of the "upward" phase and from the master station to the mobile stations in the course of the "downward" phase. This method has, amongst other things, the drawback of dividing the effective throughput by two since the data exchanged, organised into frames, pass over the transmission medium twice, one during the upward phase, the other during the downward phase.

In addition, from draft IEEE standard 802.11 or the document WO-A-95/01020, methods for accessing the communication transmission medium with distributed control are also known. Such protocols are based on carrier sensing for collision detection, and on random access to the transmission medium for their retransmission in the event of collision. Then to minimise the risks of collision, a reserve and acknowledge protocol is set in place, and implemented with relatively short frames in relation to the size of the data frames. The major drawback with such a method is that it does not avoid collisions, but simply reduces their probability through reserve and acknowledge mechanisms.

The object of the present invention is to propose a method and an apparatus for access to the transmission medium, which overcome the above drawbacks and which, in particular, prevent collisions between any communication apparatus frequently transmitting messages on this medium and all other communication apparatus.

To this end, the object of the invention is a method for sharing a transmission medium between communication apparatuses having an identifier, each adapted on the one hand to transmit messages by means of the said transmission medium, in the course of so-called "transmission" phases, and/or on the other hand to receive messages by means of the said transmission medium, in the course of so-called "reception" phases, characterised in that each communication apparatus:

in each reception phase, stores, associated with identifiers, activity states representing the last messages transmitted by the communication apparatuses possessing these identifiers, in their own transmission phases; and in a so-called "transmission preparation" phase preceding each transmission phase, determines, according to first predetermined rules taking account at least of certain of the said activity states, at what moment it can transmit a message on the transmission medium.

The invention also relates to a means for communication, on a transmission medium, which includes a memory which stores an identifier capable of being specific to it, a means for transmitting messages by means of the said transmission medium, and a means for receiving messages by means of the said transmission medium, characterised in that it includes:

a random access memory storing a list of activity states associated with identifiers of other communication apparatuses, activity states representing the latest messages transmitted by the latter communication apparatus; and a means for processing the activity states which determines, according to first predetermined rules taking account at least of certain of the said activity states, at what moment it can transmit a message on the transmission medium.

Thus each communication apparatus determines by itself at what moment it can transmit, according to procedures which minimise the risk of collision. In particular, storing the list of activity states and its use to determine the moment at which the communication apparatus in question can transmit also make it possible to identify the moment at which each of the other communication apparatuses can transmit. The rules for allocation of these moments, which are common to the communication apparatuses, thus limit the risks of collision.

As knowledge of the state of a communication apparatus is here a knowledge shared by the various communication apparatuses of the network, these communication methods, apparatuses or means require no central communication apparatus controlling access to the transmission medium by the other communication apparatuses. With collisions avoided between the communication apparatuses whose activity state is known, it is moreover not necessary to provide a reserve or acknowledge mechanism. Finally, with transmissions taking place directly between two communication apparatuses, the effective throughput is maximised.

It should also be noted that the method according to the invention can easily be implemented in any communication and/or telecommunication apparatus.

According to preferred characteristics, the first predetermined rules include the fact that the communication apparatuses which have, as their own activity state, a predetermined activity state, can each transmit before the other communication apparatuses.

In relation to this, the aforementioned processing means is adapted to determine, according to the first predetermined rules, that the communication apparatuses which have, as their own activity state, a predetermined activity state, can each transmit before the other communication apparatuses.

By means of these arrangements, communication apparatuses can enjoy preferential access to the shared transmission medium, either by virtue of the large message quantities which they have to transmit, or to prevent certain other communication apparatuses from occupying the said medium continuously.

According to advantageous characteristics, the first predetermined rules include the fact that the communication apparatuses which have a message to transmit and which have, as their own activity state, the said predetermined activity state, wait, before transmitting a message, starting from the moment the channel is unoccupied, for a random period equal to the product of the synchronisation period of the communication apparatus, on the one hand, and a random whole number determined by each of the said communication apparatuses which has a message to transmit, on the other hand.

In relation to this, in the communication apparatus according to the invention, the processing means is adapted to determine, according to the first predetermined rules, that the communication apparatuses which have a message to transmit and which have, as their own activity state, the said predetermined activity state, wait, starting from the moment the communication medium becomes unoccupied and before transmitting a message, a random period.

According to other advantageous characteristics, the communication apparatus according to the invention includes a means for generating random whole numbers and the processing means is adapted to determine, according to the first predetermined rules, that each said random period is equal to the product of the synchronisation period of the communication apparatus and a random whole number generated by the said random whole number generation means.

Thus, for these communication apparatus, the risk of collision for the messages which they transmit is limited by the random selection, only a selection giving an identical result for at least two communication apparatuses able to allow such a collision.

According to other characteristics of the method according to the invention, the first predetermined rules include the fact that if the transmission medium has remained unoccupied for a predetermined period, each communication apparatus can transmit without waiting.

In relation to this, the processing means is adapted to determine, according to the first predetermined rules, that if the transmission medium has remained unoccupied for a predetermined period, each communication apparatus can transmit without waiting.

By virtue of these arrangements, transmission delays are reduced when there are very few communication apparatuses capable of transmitting.

According to preferred characteristics of the method according to the present invention, in the message reception phase of a communication apparatus, the latter performs an operation of updating the activity states, according to second predetermined rules.

In relation to this, the communication apparatus according to the invention includes a means for updating the activity states stored in the said random access memory, according to second predetermined rules.

By virtue of these arrangements, the updating of activity states is performed according to data present in the message being received. Since these data are, a priori, received by several communication apparatuses, the latter are capable of updating in the same manner the activity states relating to the various communication apparatuses of the network.

Advantageously, the second predetermined rules include the fact that the activity state of a communication apparatus which transmits a message is "active" for all communication apparatuses correctly receiving this message.

In relation to this, the updating means is adapted, according to the second predetermined rules, to allocate the "active" activity state to another communication apparatus from which a message is correctly received by the message reception means.

Thus different communication apparatuses generally have the same state lists and can therefore each determine a suitable transmission moment.

According to other advantageous characteristics, the second predetermined rules include the fact that, at the end of a predetermined period, if a first communication apparatus does not correctly receive a message from a second communication apparatus to which the first means has allocated an "active" activity state, the activity state allocated by the first means to the second means is no longer "active".

In relation to this, the communication apparatus according to the invention includes a means for measuring a period which has elapsed since the reception means correctly received a message from another communication apparatus whose activity state is "active" and the updating means is adapted, according to the second predetermined rules, to allocate an activity state other than the "active" state when the said period is greater than or equal to a predetermined period.

Thus, for a given communication apparatus, in its list of activity states, an "active" activity state is set for the communication apparatus from which the said given communication apparatus has correctly received at least one message in the latest time interval of predetermined duration.

According to advantageous characteristics, in the transmission preparation phase of a communication apparatus, the latter performs an operation of inserting into the message to be transmitted, a state field representing at least some of the activity states stored by the said communication apparatus in the course of the reception phase, according to third predetermined rules.

In relation to this, the communication apparatus according to the invention includes a means for inserting, according to third predetermined rules, in the message to be transmitted, a state field representing at least some of the activity states stored by the said communication apparatus.

Different communication apparatuses thus generally have the same state lists and can therefore each determine a suitable transmission moment. The communication apparatuses are identified and they transmit activity states to each other. Consequently, though it is not possible to prejudge the proper reception of each message by all the communication apparatuses, the activity states are, on the one hand, stored by each of them and, on the other hand, transmitted between them, which enables each communication apparatus to determine at what moment it can transmit a message while avoiding this moment being common with another communication apparatus.

According to advantageous characteristics, the third predetermined rules include the fact that the state field inserted includes the identifiers of the communication apparatus for which the activity state stored by the communication apparatus which performs the insertion operation is "active", that is to say corresponds to the correct reception of a message coming from the communication apparatus which has the said identifier, over a predetermined period.

In relation to this, the communication apparatus according to the invention includes a means for measuring a period which has elapsed since the reception means correctly received a message from another communication apparatus, and the insertion means is adapted, according to the third predetermined rules, to insert a state field which includes the identifiers of the communication apparatus for which the activity state is "active", that is to say for which the said period is less than a predetermined period.

By virtue of these arrangements, the identifiers of all communication apparatuses considered "active" are transmitted, and two time intervals, one allocated to the communication apparatuses considered "active" and the other to the other communication apparatuses, can be distinguished.

According to other advantageous characteristics, the first predetermined rules include the fact that the communication apparatuses whose identifiers are in the state field can transmit in the order of their respective identifiers in the state field.

In relation to this, the processing means is adapted to determine, according to the first predetermined rules, that the moment at which the communication apparatus can transmit depends on the position of the identifier of the said communication apparatus in the state field.

By virtue of these arrangements, the time interval which is reserved for the communication apparatuses considered "active" is shared between these communication apparatuses according to the order of their identifiers. The risks of collision between messages transmitted by these communication apparatuses considered "active" are therefore eliminated.

According to other advantageous characteristics, the third predetermined rules include the fact that the state field inserted includes the identifier of the communication apparatus which inserts the said field.

In relation to this, the aforementioned insertion means is adapted, according to the third predetermined rules, to insert a state field which includes the said identifier of the communication apparatus which inserts the said field.

Thus, since the identifier of the communication apparatus which inserts the said field is inserted into the state field, the time interval for the transmission of a next message by this means is defined.

According to preferred characteristics, in the message reception phase of a communication apparatus, the latter performs an operation of updating the activity states according to the state field present in the message received, according to fourth predetermined rules.

In relation to this, the communication apparatus according to the invention includes a means for updating the list of activity states which allocates activity states to the communication apparatuses according to the state field present in the message received, according to fourth predetermined rules.

Thus the activity states allocated to the same given communication apparatus and stored in several communication apparatuses are generally identical.

According to advantageous characteristics, the fourth predetermined rules include the fact that the identifiers present in the state field and which, for the communication apparatuses which receives the message, are not assigned an "active" activity state, that is to say corresponding to correct reception of a message coming from the communication apparatus having the said identifier, over a predetermined period, are assigned a "presumed active" activity state.

In relation to this, the communication apparatus according to the invention includes, for other communication apparatuses, a means for measuring a period which has elapsed since the reception means correctly received a message from another said communication apparatus, and the updating means is adapted, according to the fourth predetermined rules, to allocate to each communication apparatus which has an identifier present in the state field and which is not assigned an "active" activity state, that is to say for which the said period is less than a predetermined period, a "presumed active" activity state.

By virtue of these arrangements, a first communication apparatus which has not correctly received a message from a second communication apparatus and which, consequently, has not allocated the "active" activity state to it, allocates the "presumed active" activity state to it if it receives, from a third communication apparatus, a message in which the second communication apparatus is considered "active" or "presumed active".

According to other advantageous characteristics, the third predetermined rules include the fact that the state field inserted includes the identifiers of the communication apparatuses for which the activity state stored by the communication apparatus performing the insertion operation is "active" or "presumed active".

In relation to this, the aforementioned insertion means is adapted, according to the third predetermined rules, to insert a state field which includes the identifiers of the communication apparatuses for which the activity state stored by the communication apparatus performing the insertion operation is "active" or "presumed active".

The "presumed active" communication apparatuses thus have their identifier transmitted in the same manner as the "active" communication apparatuses.

According to other characteristics of the method of the invention, the fourth predetermined rules include the fact that, when an identifier whose activity state stored by a communication apparatus is "presumed active" is absent from a state field, the said activity state becomes "inactive".

In relation to this, the updating means is adapted, according to the fourth predetermined rules, to allocate the "inactive" activity state to an identifier whose activity state stored by the random access memory is "presumed active" and which is absent from a state field inserted into the last message received correctly by the message reception means.

By virtue of these arrangements, the first communication apparatus cited above, which has allocated the "presumed active" activity state to the second communication apparatus without knowing how long it was since the third communication apparatus had correctly received a message from the second communication apparatus and therefore at what moment this third communication apparatus would no longer allocate the "active" activity state to the second communication apparatus, stops allocating the "presumed active" activity state as soon as, in a message which it receives correctly, the second communication apparatus is no longer "presumed active".

According to preferred characteristics, in the transmission preparation phase of a communication apparatus, the latter performs an operation for determining an identifier which is capable of being specific to it, according to fifth predetermined rules, as a function of its own activity state and other activity states.

In relation to this, the communication apparatus according to the invention includes a means for determining an identifier which is capable of being specific to it, according to fifth predetermined rules, as a function of its own activity state and other activity states.

Thus each communication apparatus is identified whilst avoiding choosing an identifier which another communication apparatus has already allocated to itself.

According to advantageous characteristics, the fifth predetermined rules include the fact that, in the transmission preparation phase of each communication apparatus, the latter performs an operation of inserting, into the message to be transmitted, a state field representing at least some of the activity states stored by the said communication apparatus in the course of the reception phase, according to third predetermined rules, and that, if the identifier of a communication apparatus which receives the said message is absent from the said state field, the latter communication apparatus takes a predetermined identifier as its identifier.

In relation to this, an insertion means is adapted to insert into the message to be transmitted a state field representing at least some of the activity states stored by the said communication apparatus in the course of the reception phase, according to third predetermined rules, and, if the preceding identifier of the said communication apparatus is absent from the state field of a message received by the reception means, the means for determining an identifier is adapted, according to the fifth predetermined rules, to take a predetermined identifier as its identifier.

By virtue of these arrangements, when a communication apparatus is no longer considered "active" by the other communication apparatuses, it detects this by receiving a message in which its identifier is absent. The predetermined identifier which it allocates to itself then represents its inactivity and is common to all the communication apparatuses.

According to other advantageous characteristics, the fifth predetermined rules include the fact that, to transmit, a communication apparatus which has the said predetermined identifier chooses at random an identifier which is different from the said predetermined identifier and different from the identifiers already allocated to other communication apparatuses.

In relation to this, the means for determining an identifier is adapted, according to the fifth predetermined rules, when the communication apparatus is to transmit a message and if the previous identifier of this means is the predetermined identifier, to choose at random an identifier which is different from the said predetermined identifier and different from the identifiers which are present in the state field of the last message which the reception means has received correctly.

Thus a communication apparatus which has the predetermined identifier, representing its inactivity, chooses another identifier, which will represent its activity, to transmit a message. The random choice of this identifier contributes to the fact that two communication apparatuses which were inactive and which wish to transmit simultaneously do not choose the same identifier. This characteristic also enables each communication apparatus to have at its disposal an identifier which is short since it is not necessary for it to be universal, such as, for example, the so-called "Ethernet" MAC (Medium Access Control) address.

According to advantageous characteristics, the communication apparatus includes a wireless communication module.

These communication apparatuses offer the same advantages as the methods which they implement and which are detailed above. Their respective advantages are not, therefore, repeated here.

The present invention also relates to a communication system which includes at least one communication apparatus as disclosed briefly above.

The present invention also has as its object a communication system which implements the method for sharing a transmission medium as disclosed briefly above.

The present invention also relates to a communication apparatus capable of communicating with a first communication apparatus, comprising: identifying means for identifying an activity state of said communication apparatus in accordance with information received from the first communication apparatus, the information including state information indicating the activity state of said communication apparatus; transmitting means for transmitting a message at the timing determined on the activity state identified by said identifying means.

The present invention also relates to a communication apparatus used in a communication system having a plurality of communication apparatuses, in which first one of said communication apparatuses can communicate with second one of said communication apparatuses, said apparatuses comprising identifying means for identifying an activity state of the communication apparatus in accordance with information received from the first communication apparatus, the information including state information indicating the activity state of the first communication apparatus; transmitting means transmit an information indicating the activity state of the first communication apparatus identified by said identifying means.

The advantages of the last two purposes of the present invention being the same as the above-mentioned ones, they are not recited here.

Other characteristics and advantages of the invention will emerge hereinafter with the help of the description which follows, made with reference to the accompanying drawings in which:

FIGS. 6A and 6B are diagrammatic figures illustrating respectively the organisation of a read-only memory and a random access memory used in the apparatus of FIG. 4.

Figures 1, 2:
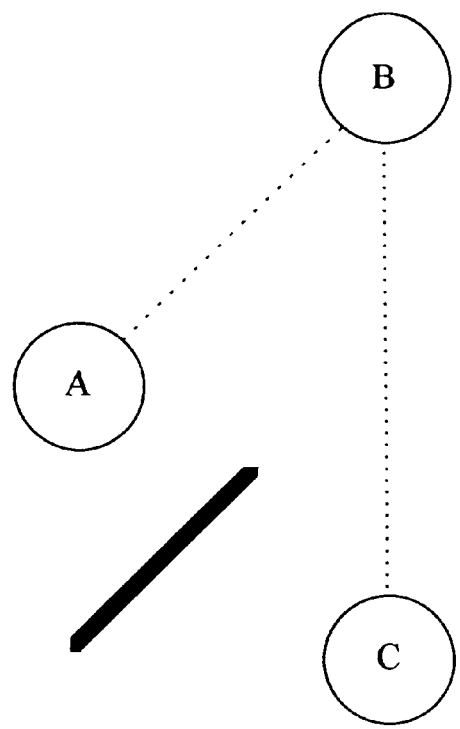
FIG. 1 is a schematic representation of a wireless network composed of three communication apparatuses A, B and C in which the communication apparatuses A and C are out of range of each other.
FIG. 2 depicts an example of the structure of messages exchanged by the communication apparatus in accordance with the invention.

It should be stated that, in the field of communications, a "transmission medium" is considered to be any communication channel or medium, for example one or more wavelengths, one or more wavebands or an optical or electrical wired network.

Throughout the description, "loop x to y", where x and y are sequences of alphanumeric data, refers to all the operations in a flow diagram whose references are alphanumerically between x and y, inclusive, and which are capable of being repeated according to a procedure detailed in the description.

In the description, "state" or "activity state" of a communication apparatus refers to an item of data stored or transmitted by a communication apparatus and representing the period which has elapsed since the communication apparatus is considered to have transmitted a message on the transmission medium.

Finally, in the description which follows, "data" refers to alphanumeric signs, to symbols, to groups of symbols or alphanumeric signs and to groups of frames such as, for example, all the frames waiting to be transmitted by a given communication apparatus.

1) General description of the method

In this embodiment, a master station which controls all the transmission medium does not exist, but the system which enables to communicate each of the communication apparatuses to the allocated communication apparatus such as communication apparatus A and communication apparatus C, is explained.

The embodiment transmits the information identified by the apparatus as well as the message together with the activity state of other communication apparatuses.

The communication apparatus which received the message notifies not only the identifier and the activity state of the sender, but the receiver's own activity state and the activity state other than the sender.

When transmitting to other communication apparatuses, the notified activity states including the activity state of the first sender will be transmitted together with the message.

The previous communicating system without a master station could not identify the activity state of the communication apparatuses other than the partners (for example, when communication apparatuses A and B are transmit-receive with each other, both A and B was impossible to identify the activity state of communication apparatus C, a communication apparatus other than themselves) but this invention presents a method to identify the activity state of the communication apparatuses not in touch by transmitting the previous activity state together with the message. It is possible to identify the activity state of the communication apparatuses unable to get in touch, due to the transmission trouble for example, by the received information.

In addition, each communication apparatus is able to identify the activity information of the other communication apparatuses when they are in use by monitoring the message.

At the apparatus identifies its own activity state, it is possible to avoid the corruption of the messages and to watch the timing of transmission on the basis of the activity state received.

On the basis of FIGS. 1 to 3 and Table 1, a particular embodiment of the method according to the invention will now be described.

A description will firstly be given, on the basis of FIG. 2 and Table 1, of the structure of a message M to be transmitted by a communication apparatus H, which, it is assumed, wishes to transmit data (D) to one or more other communication apparatuses.

The structure presented here, by way of example, corresponds from left to right to the elements, or fields, transmitted successively by the communication apparatus H. Their respective lengths in FIG. 2 are not to scale and depend on the number of items of data or signals to be transmitted for each field.

In accordance with this particular embodiment of the invention, the message M firstly comprises a preamble (P) enabling any other communication apparatus H' within range of the communication apparatus H to synchronise itself and therefore correctly receive the message M. The production of this preamble (P) is known to public communications experts.

The following field, called the sender field (E) contains the identifier of the transmitting station. To this end, a communication apparatus H allocates to itself an identifier h capable of being specific to it and records itself by placing this identifier in the sender field (E) of messages which it broadcasts. The choice of the identifier h will be explained below through the description of the state field (L).

The following field, called the data field (D), contains the data which the communication apparatus 11 wishes to transmit to one or more other communication apparatus. These data can be of any kind, such as Ethernet 802.3 frames for example.

Then the so-called "state (L)" field contains, firstly, a list of the identifiers of the communication apparatuses considered "active" or "presumed active" (see below for the meaning of these activity states) by the communication apparatus H and, secondly, the identifier h of the communication apparatus H itself. It will be noted in this regard that a communication apparatus H is, when it is not itself transmitting, continuously listening to the transmission medium so as to keep the state of the other communication apparatuses up to date using the data present in the state fields and in the identifier field of messages transmitted by certain of these communication apparatuses.

On the basis of Table 1, appended at the end of the description, for a communication apparatus H, the transitions in the state of a communication apparatus H' identified as h, will be explained.

According to the embodiment chosen and depicted, three activity states are allocated by each of the communication apparatuses to all the communication apparatuses:

"active" when the apparatus which allocates this state has correctly received a message coming from the apparatus to which this state is allocated, over a predetermined period;

"presumed active" when the apparatus which allocates this state has not correctly received a message coming from the apparatus to which this state is allocated but has received a message designating it as "active" or "presumed active";

"inactive" in the other cases.

When it has data to transmit, each communication apparatus transmits with them the list of identifiers of the communication apparatuses to which it has given an "active" or "presumed active" activity state. When it receives a message correctly, each communication apparatus updates the activity states of the communication apparatuses.

Still according to this embodiment, after the transmission of a message and until another message is transmitted on the shared communication medium:

during a period $T_S$ presented below, the time is divided into intervals of time in the course of which the following are successively and alternately permitted to transmit:

the communication apparatuses which consider themselves inactive;

in order of identifier listed in the message which either active or inactive has last received correctly.

after this period $T_S$, any communication apparatus, as soon as it has a message to transmit.

Finally, a communication apparatus which has allocated no active or presumed active activity state waits for the same period $T_S$ before transmitting a message on the communication medium.

Thus, by a communication apparatus H, the state of a communication apparatus H' identified as h' changes to the "Active" state on reception of the last message correctly received by the communication apparatus H with a sender field (E) containing h' and remains in this "Active" state for a predetermined period $T_I$, called the "inactivity period".

Similarly, by a communication apparatus H, the state of a communication apparatus H' identified as h' changes to the "Presumed Active" state on reception of the last message correctly received by the communication apparatus H, on the one hand whose sender field (E) contains h", the identifier of a communication apparatus H" other than the communication apparatus H', and on the other hand whose state field (L) contains h. It remains in the "Presumed Active" state until the reception of the next message correctly received by the communication apparatus H which does not contain h' in the state field (L).

Finally, the identifier h' being associated with the "active" activity state by the communication apparatus H, if the latter receives no correct message whose sender field (E) contains the identifier h' during the said "inactivity period" $T_I$, or if the last message correctly received by the communication apparatus H does not contain the identifier h' in the state field (L), the state of the communication apparatus identified as h' changes to the "Inactive" state for the communication apparatus H.

In order to choose its identifier, prior to the transmission of a message, the communication apparatus H checks whether its identifier h is contained in the state field (L) of the message correctly received lately.

If a communication apparatus H cannot find its own identifier h in the received message M within the state field (L) and notes that it is considered by the other communication apparatuses to be "inactive", it considers itself to be "inactive" and, when it has a message to transmit, it records itself in the sender field (E) of transmitting message M with an identifier h drawn at random from amongst the identifiers which, on the one hand, do not appear in the state field (L) and, on the other hand, do not serve as an identifier for an "active" station known to communication apparatus H.

Conversely, if it considers itself "active", and if the communication apparatus H recognises its identifier h in the state field (L), the communication apparatus H stores its identifier h, and records it in the sender field (E) of message M.

Finally, the message M contains a check field (C) enabling any communication apparatus H' within range of the communication apparatus H to judge the integrity of message M. In a particular embodiment, this check field (C) can, for example, consist of a CRC (cyclic redundancy check), which is well known to experts and will not be detailed here.

The method for accessing a transmission medium will now be described on the basis of FIG. 1, a method as implemented in the invention, by explaining how three communication apparatuses A, B and C of a network are able to transmit data. It is assumed here that the communication apparatuses A and C are out of range, that is to say the communication apparatus A is able to receive the messages transmitted from communication apparatus B correctly but does not correctly receive the messages transmitted by the communication apparatus C and vice versa. Such a network is depicted in FIG. 1. The oblique bar positioned between the communication apparatus A and C indicates that they are situated out of range of each other.

It should be stated that, in accordance with the embodiments, any communication apparatus which is not transmitting, listens either continuously or periodically to the transmission medium and keeps the state of the communication apparatuses of the network which it knows updated. In this embodiment, a master station to controls all the transmission medium does not exist, and each of the communication apparatus is able to communicate with allocated communication apparatus apart from the case such as communication apparatus A and communication apparatus C which is unable to communication by some reason.

Figure 3:
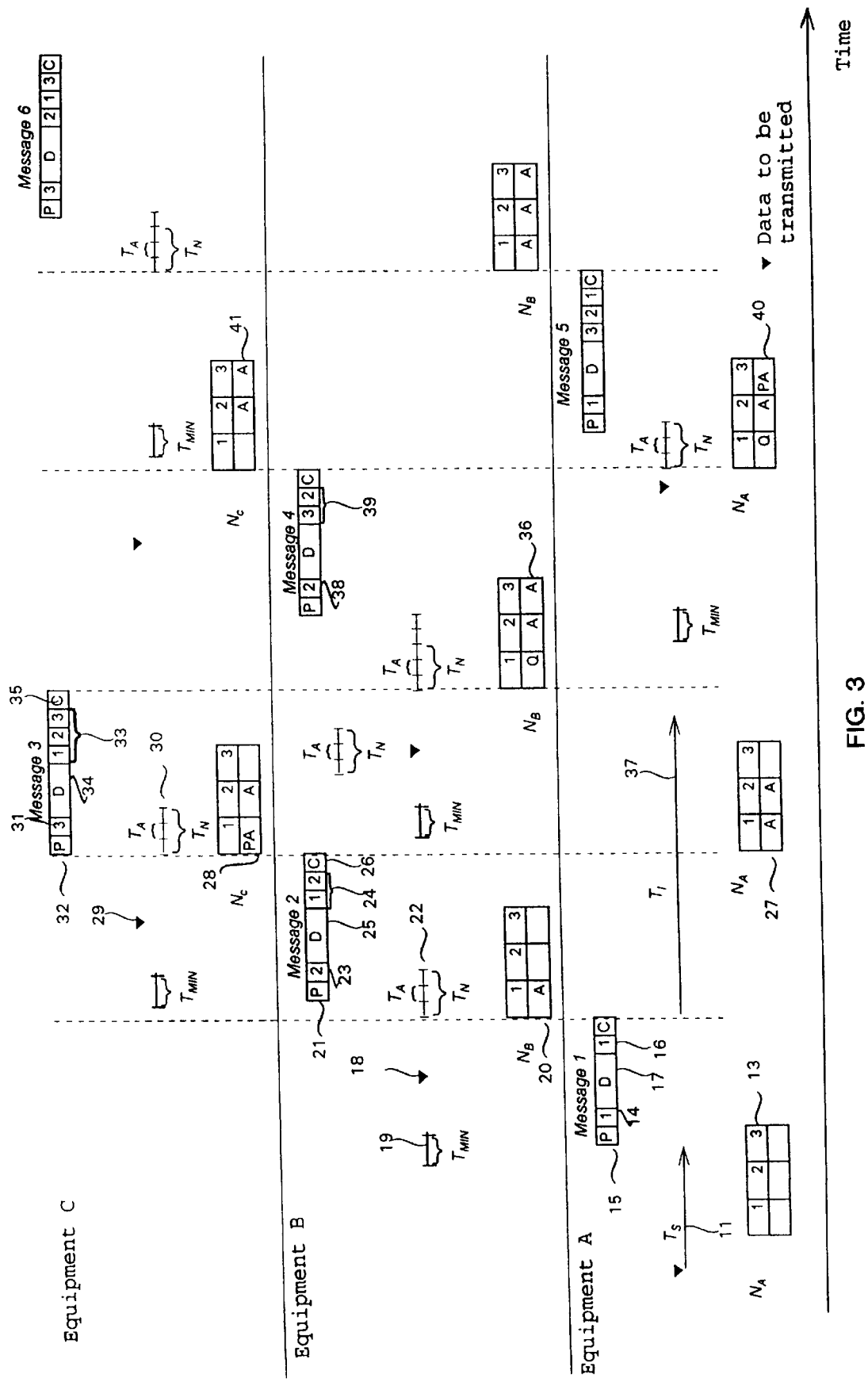
FIG. 3 illustrates, by an example, access to the transmission medium of the three communication apparatuses A, B and C of FIG. 1.

In FIG. 3, there are depicted, over time, along the x-axis, from top to bottom, for each of the communication apparatuses or pieces of equipment C, B and A, separated by horizontal lines:

the fields of each message to be transmitted by the said communication apparatus;

the numerical value of the identifier "id" of the communication apparatus in question, the moment at which the data of the field (D) of each message are available to be transmitted, by an equilateral triangle pointing downwards;

intervals of time used by the communication apparatus to determine the communication procedure; and the activity table stored by the communication apparatus in question, each activity table includes the communication apparatus within the communication range and their activity state stored in the communication apparatus in question. In FIG. 3, the activity states are either "A" for "Active", or "PA" for "Presumed Active", or "Q" or empty for "Inactive".

For the sake of clarity in FIG. 3, vertical dotted lines distinguish simultaneous events at the transmission of each message;

The communication apparatus A is the first communication apparatus wishing to transmit data (D). Since the communication apparatus A has not previously transmitted any message, it waits for a predetermined period $T_S$ 11, called the "period of silence". During this period of silence 11, the transmission medium remains unoccupied, and the table $N_A$ 13 representing the activity state of each communication apparatus known to the communication apparatus A, is empty. As no identifier has been retained by one of the other communication apparatuses, the communication apparatus A chooses at random a non-zero identifier which, in our example, is the integer "1", and places its identifier "1" in the sender field (E) 14 of the message 15 to be transmitted, Message 1. Likewise, since no communication apparatus has been registered as "Active" or "Presumed Active" by the communication apparatus A the state field 16 (L) of the message 15 Message 1 is limited to the identifier of the communication apparatus A itself, namely "1".

The data to be transmitted are then placed in the data field (D) 17, and the check field (C) is constituted according to the data present in the fields (E) 14, (D) 17 and (L) 16.

As the transmission medium remains unoccupied for the period $T_S$, called the "period of silence", the communication apparatus A starts to transmit Message 1 from the end of the period of silence 11, by transmitting the preamble (P).

In the example in FIG. 3, as the communication apparatus B is within range of the communication apparatus A, the communication apparatus B is capable of receiving Message 1 correctly, which is not the case for the communication apparatus C.

In the example in FIG. 3, the second communication apparatus to want to transmit data (D) is the communication apparatus B. It is assumed that the decision to transmit these data (D) was taken by the communication apparatus B at a moment 18, during the transmission of Message 1 by the communication apparatus A.

During the transmission of Message 1, the communication apparatus B detects the occupation of the transmission medium by running the career sense and waits to transmit its message, thereby avoiding a collision with Message 1. Furthermore, the communication apparatus B detects the occupation of the transmission medium for a period greater than a period $T_{MIN}$ 19 called the "minimum presence" period, it is not necessary for it to wait for the period $T_S$ before transmitting, unlike the communication apparatus A for transmission of Message 1. On the other hand, if it had detected an occupation of the transmission medium for a period less than this period $T_{MIN}$, the communication apparatus B would not have taken account of it. Assuming moreover that Message 1 has been correctly received by the communication apparatus B, (which the communication apparatus B has been able to ascertain through analysis of the check field (C)), analysis of the sender field (E) of Message 1 has enabled the communication apparatus B to record in the "Active" state the communication apparatus identified by the identifier "1" in the table $N_B$ 20, representing the activity state of each communication apparatus known by the communication apparatus B. Furthermore, analysis of the state field (L) of Message 1 reveals to the communication apparatus B that, according to the communication apparatus identified by "1" (field (E) of the message 15), only the communication apparatus identified "Active" or "Presumed Active" state. In the present case, the communication apparatus identified as identifier <<1>>, which means communication apparatus B will be able to know the communication apparatus A is <<active>>.

In accordance with the embodiments, since the communication apparatus B is not registered as "Active" in the state field (L) of Message 1, the last message correctly received by the communication apparatus B, the latter can start transmitting its message 21 Message 2 only during the time slot reserved for the "Inactive" communication apparatuses, that is to say during the time interval 22 of duration $T_N$ counted from the moment the transmission medium changes to the unoccupied state.

Thus in FIG. 3 the communication apparatus B can decide to transmit in the slot of duration $T_N$ counting from the end of Message 1. In accordance with an aspect of the present invention, in order to limit the probability of collision between messages transmitted in this slot, the communication apparatus B chooses at random a number a between 0 and a number NMAX presented and starts transmitting in the (a+1)th interval of duration $T_A$ in the elementary period. In the example in FIG. 3, it is assumed that the number a chosen at random is 1.

The communication apparatus B then chooses a non-zero random identifier, with the exception of 1 (which is the identifier of a communication apparatus already present in the field (L) of the last message received by the communication apparatus B), that is in our example the identifier "2": it places the identifier "2" in the sender field (E) 23 of Message 2.

Finally, the communication apparatus B places in the state field (L) 24 of Message 2, on the one hand the list of identifiers of the "Active" or "Presumed Active" state communication apparatus of which it has knowledge, namely "1", and then on the other hand its own identifier "2". Which means in this case, communication apparatus B lists identifier <<1>> as active in the state field (L) of Message 2 and its own identifier <<2>>.

It then places the data to be transmitted in the field (D) 25 of Message 2 and then the check data in the field (C) 26 of Message 2. The communication apparatus B transmits the message 21, commencing with a preamble (P).

As the communication apparatuses A and C are both within range of the communication apparatus B, it is assumed that they receive Message 2 correctly and record the identifier "2" in the "Active" state respectively in the activity tables $N_A$ 27 and $N_C$ 28, representing respectively the state of the communication apparatuses known to the communication apparatuses A and C and stored in their random access memory. Through analysis of the state field (L) 24 of Message 2, the communication apparatus C also records the communication apparatus identified as "1" in the "Presumed Active" state according to the rules defined above with regard to Table 1. For its part, the communication apparatus A recognises its identifier "1" in the state field (L) 24, and therefore considers itself "Active".

In a similar fashion, the transmission of the message 32, Message 3, by the communication apparatus C will now be briefly described on the basis of FIG. 3. It is assumed that the decision to transmit has been taken by the communication apparatus C at a moment 29, during the transmission of Message 2 by the communication apparatus B.

In accordance with the embodiments, as the communication apparatus C is not registered as "Active" in the list in the state field (L) of Message 2, the last message correctly received by the communication apparatus C, the latter can start transmitting its message only during the time slot reserved for the "Inactive" communication apparatuses, that is to say during the time interval 30 of duration TX counted from the moment the transmission medium becomes silent once more.

It should be noted in this regard that, even when it does not receive a message correctly, a communication apparatus can be capable of detecting that the communication medium is occupied.

The actual transmission interval is chosen at random by the communication apparatus C same as when the communication apparatus B transmitted the message Message 2. Namely 0 in this case.

The communication apparatus C then chooses at random a non-zero identifier, other than "1" and "2" (the identifier which it received in the field (L) of the last message which it received correctly). It chooses, in our example, the identifier "3", and places "3" in the sender field (E) 31 of the message to be transmitted 32, Message 3. In the state field (L) 33, the communication apparatus C places the list of identifiers of the "Active" or "Presumed Active" state communication apparatuses of which it has knowledge, namely "1", associated with the "presumed active" state, and "2", associated with the "active" state, then its own identifier "3".

It then places the data to be transmitted in the field (D) 34 and the check codes in the field (C) 35 and starts transmission of the message 32 with a preamble (P).

On reception of Message 3, the communication apparatus B recognises the identifier "3" in the sender field (E) 31 and therefore records the communication apparatus identified as "3" as "Active" in the activity table $N_B$ 36. It also recognises its own identifier "2" in the state field (L) 33 and then considers itself "Active". On the other hand, assuming that, since the transmission of Message 1, a time interval 37 whose duration is equal to the "inactivity period" $T_I$ has elapsed, the communication apparatus B considers the communication apparatus identified as "1" as having the "Inactive" activity state.

Let it be supposed moreover that, during the transmission of Message 3, the communication apparatus B again has data (D) to transmit. As the communication apparatus B considers itself "Active", the transmission start slot reserved for it is the nth elementary period of duration $T_A$ counted from the end of the time interval reserved for the "Inactive" communication apparatus where n is the position of "2" in the list in the state field (L), namely the second position and therefore the second period. In accordance with the present embodiments, the sender field (E) 38 and state field (L) 39 of Message 4 respectively contain "2" (sender field) and "3" and then "2"(state field).

The communication apparatuses A and C correctly receive Message 4. They therefore record the communication apparatus identified as "2" as "Active" in the activity tables $N_A$ 40 and $N_C$ 41.

The communication apparatus C moreover recognises its identifier "3" in the state field (L) 39 and also considers itself "Active". On the other hand, since the communication apparatus A has not, for its part, correctly received any message until now whose sender field (E) contains the identifier "3", the communication apparatus A records "3" in the "Presumed Active" state. Furthermore, since the identifier of the communication apparatus A, of value "1", does not appear in the state field (L) 39 of Message 4, the communication apparatus A considers itself "Inactive".

It is assumed that the communication apparatuses A and C have both had new data to transmit during the transmission of Message 4. As the communication apparatus C considers itself "Active", it has to wait for the slot reserved for it, namely the first slot of duration elementary period $T_A$ consecutive to the slot reserved for "Inactive" communication apparatuses. As the communication apparatus A is, for its part, "Inactive", it chooses a random number so as to choose its transmission start period in the slot of duration $T_N$ counting from the moment the transmission medium so becomes unoccupied again, namely "2" in the example in FIG. 3. It also chooses at random a non-zero identifier with the exception of the identifiers 2 and 3. This identifier is, in this case, again "1". The communication apparatus A starts transmitting its message Message 5. As the communication apparatus C is listening to the transmission medium, it realises that the transmission medium is occupied, although it does not receive this message correctly, and postpones the transmission of its message until later.

As Message 5 has not been received correctly by the communication apparatus C, the latter keeps the last message correctly received, namely Message 4, in order to know the transmission time reserved for it.

After the occupation of the transmission medium by Message 5, the communication apparatus C can transmit in the first period of duration $T_A$ after the time interval of duration $T_N$ reserved for the "Inactive" communication apparatuses.

The transmission of Message 6 takes place in accordance with this rule as illustrated in FIG. 3.

Accordingly, it will be noted that, by virtue of the invention, collisions are avoided for Message 5 and Message 6, although the communication apparatuses A and C simultaneously had these messages to transmit and these communication apparatus are out of range.

2) Description of a particular embodiment of an apparatus in accordance with the invention On the basis of FIG. 4, a particular embodiment of an apparatus implementing the method according to the invention will now be described.

Figure 4:
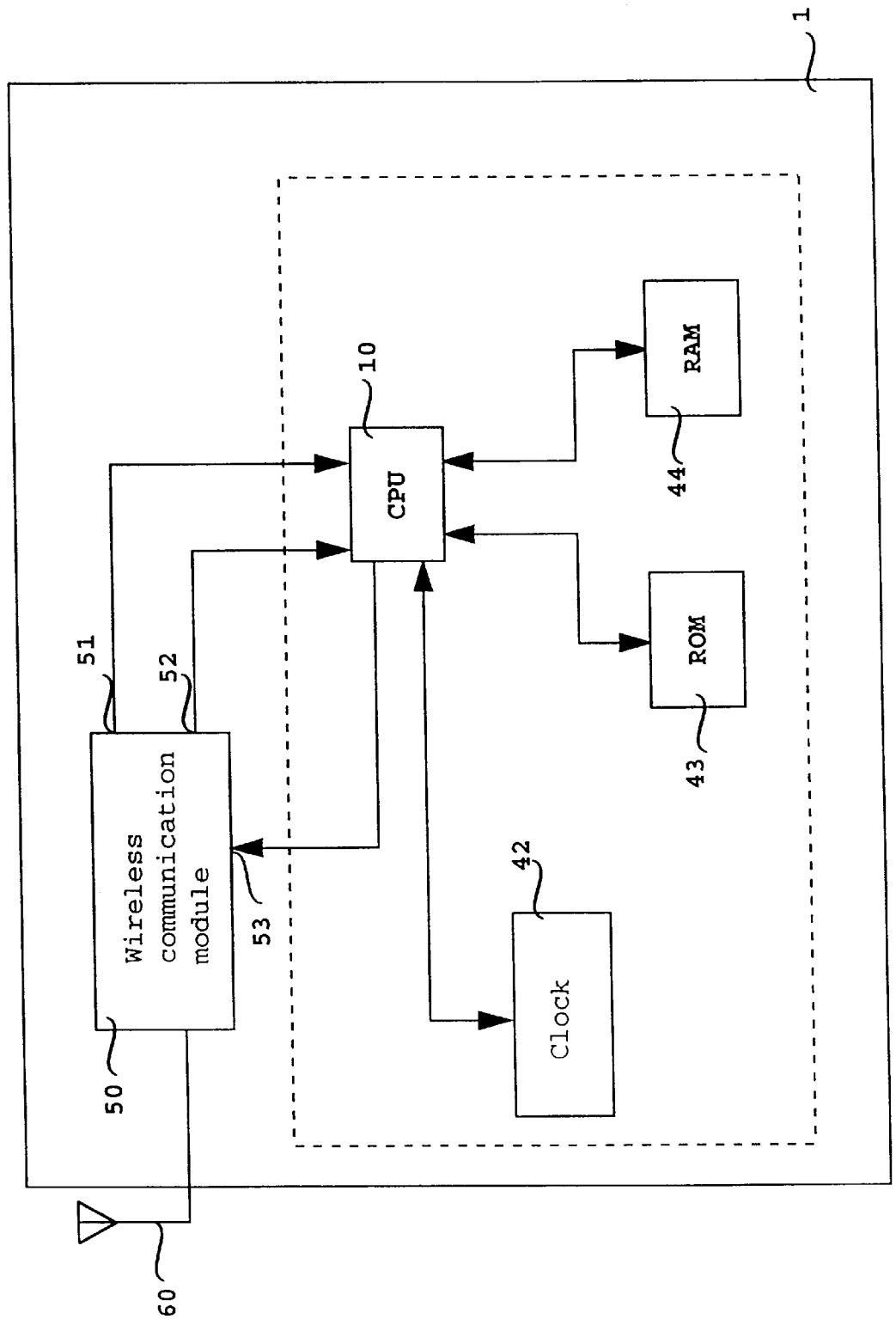
FIG. 4 is a simplified diagram integrating an apparatus in accordance with the invention.

FIG. 4 is a block diagram of a particular embodiment of an apparatus according to the invention. On the basis of FIG. 4, the communication apparatus 1 incorporates a processor 10 connected by a bus (not shown) firstly to a read-only memory 43 in which notably the programs executed by the processor 10 are recorded and, secondly, a random access memory 44 notably including a working area, various data registers and an area reserved for storage of messages received or awaiting transmission.

Processor 10 is able to be formed by a micro computer.

The content of the random access memory 44 and read-only memory 43 is detailed in conjunction with FIGS. 6A and 6B respectively.

On the basis of FIGS. 6A and 6B, The read-only memory 43 includes the registers:

"MAX_EQUIPMENT", which corresponds to the maximum number of communication apparatuses designed to communicate on the shared transmission medium;

"NMAX", which corresponds to the maximum number which can be taken by the variable a corresponding to the random fraction which a communication apparatus has to wait before transmitting;

"minimum presence" $T_{MIN}$, which contains a minimum period of presence of a message on the transmission medium. Below this period, an occupation of the transmission medium is not taken into account by the communication apparatus;

"period of inactivity" $T_I$, a register containing a period measured following the correct reception of a message coming from a communication apparatus, during which the "active" activity state is allocated to the said communication apparatus;

"period of silence" $T_S$, which contains a period during which a communication apparatus which wants to transmit a first message on the shared communication medium has to wait before this transmission, when this communication apparatus does not detect any message on the communication medium.

"elementary period" $T_A$, which contains a period enabling all the communication apparatus to fix a time scale and synchronise with each other, the origin of the time being chosen at the time the communication medium becomes unoccupied. This elementary period must be chosen so as to have a value greater than the period for detection, by a communication apparatus, of a transmission performed by another communication apparatus. In this case, the value of the period for synchronisation of the receiving communication apparatus with the transmitting communication apparatus, the period of the preamble of any message transmitted on the shared communication medium, is chosen as the value of the elementary period;

"transmission start interval" $T_N$, which contains the period of the time intervals reserved for items of equipment which have an "inactive" activity state. In the example embodiment described here, the period $T_N$ is the product of the elementary period $T_A$ and the maximum number which the variable a corresponding to the random fraction which a communication apparatus has to wait before transmitting can take; and the sub-programs of the program controlling the operation of the processor and presented with regard to FIGS. 5A to 5E.

The random access memory 44 includes registers each containing a variable with which the register in question shares its name:

"h", which corresponds to the identifier of the communication apparatus H in question;

"state", which corresponds to the activity state of the communication apparatus H in question, an activity state which can Lake three values, "active", "presumed active" or "inactive";

"position", which corresponds to the position of the identifier h in the activity state field;

"$N_H(1)$", "$N_H(2)$" ... "$N_H(MAX\_EQUIPMENT)$", which correspond to the variables of a table $N_H$ of the activity state, a table stored by the communication apparatus H;

"Down counter (1)" ... "Down counter (MAX_EQUIPMENT)", which correspond to down counters related to each communication apparatus and which are decremented progressively as disclosed below;

"List_Size", which corresponds to the number of elements in the list in the state field (L) of the last message correctly received "Received_sender", which corresponds to the value of the sender field (E) of the last message received "l_r", which corresponds to a pointer to an element of the list in the state field (L);

"l_e", which corresponds to a pointer to an element of the list in the state field (L);

"a", which corresponds to a number chosen at random between 0 and NMAX, serving to multiply an elementary period to obtain a waiting period;

"d", which corresponds to the number of the current down counter;

"Transmitted_Message", which contains the message which the communication apparatus in question is preparing to transmit;

"Transmission_Wait", which corresponds to the period measured between the moment the channel becomes unoccupied and the start of transmission of the message Transmitted_Message; and "Received_Message", which contains the last message received by the communication apparatus in question.

"Unoccupied_Channel_Period", which corresponds to a counter of the period which has elapsed since the transmission medium became unoccupied; and "Occupied_Channel_Period", which corresponds to a counter of the period which has elapsed since the transmission medium became occupied.

In this embodiment, the communication apparatus 1 includes a wireless communication module 50 which enables the communication apparatus 1 to transmit and receive data with other communication apparatuses. These data can, for example, be transmitted and received on an infrared or ultrasound transmission medium or, as in this particular embodiment, on a radio transmission medium. This wireless communication module can be implemented using a component of reference MTR-2400M 2.4 GHz GFXK Wireless Model supplied by Pulse Engineering located at San Diego in the United States.

The interface between the wireless communication module 50 and the processor 10 is made by:

the port 51, a read port whose binary value represents the state of occupation of the wireless transmission medium at a given moment, the port 52, a read port on which the processor 10 can find the data received by the communication apparatus 1, the port 53, a write port where the communication apparatus 1 can go to write the data which it wishes to broadcast on the wireless transmission medium.

Finally, the processor 10 is connected to a clock 42, enabling it to carry out operations at regular intervals, such as read/write operations on the ports 51, 52, 53 for example.

The operation of the communication apparatus 1 will now be described in conjunction with FIGS. 5A to 5F.

Figure 5A:
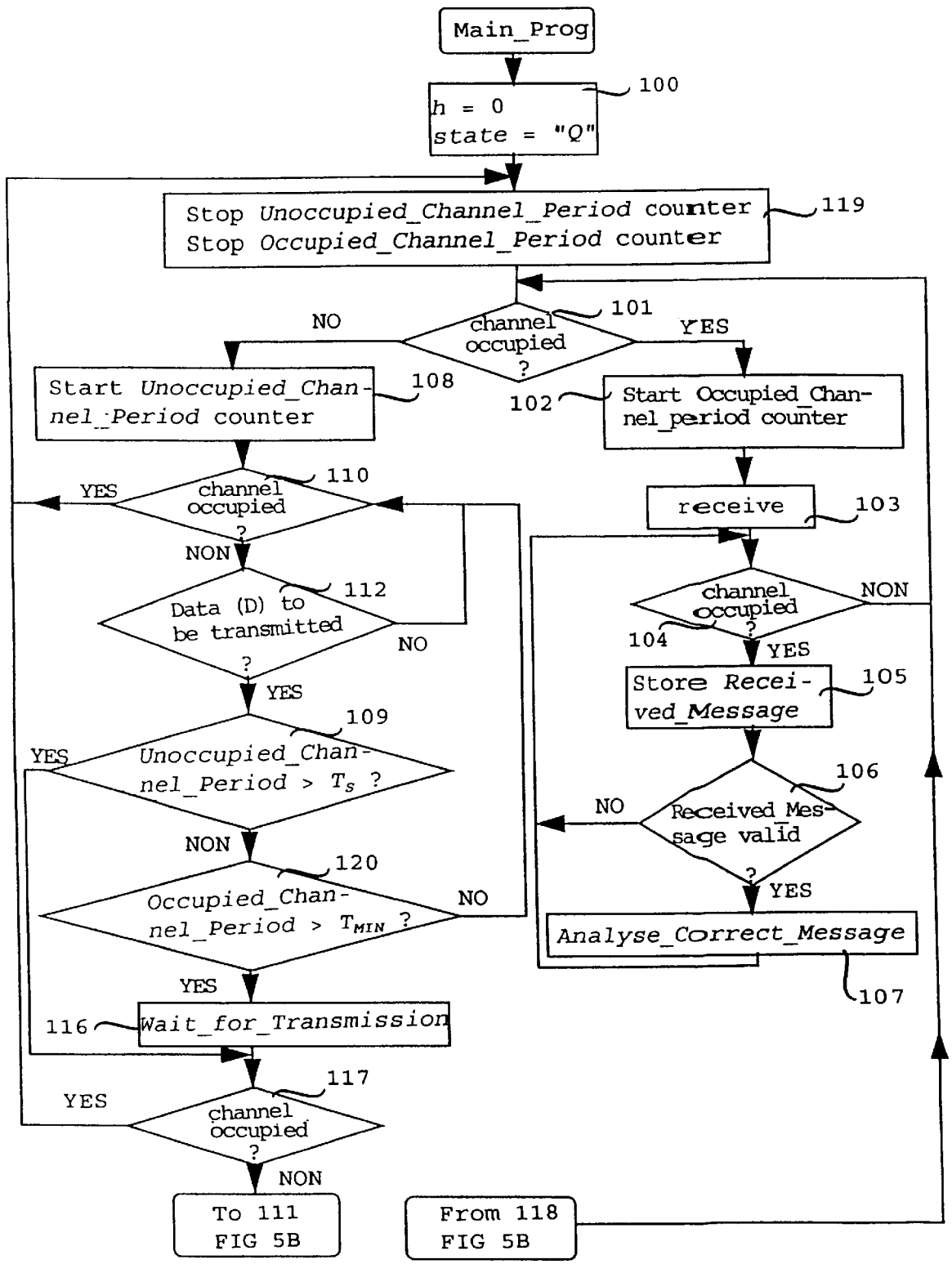
FIGS. 5A and 5B are parts of a flow diagram of the main program used by the apparatus of FIG. 4.

During the step 100 on the basis of FIG. 5A, the state register in which the state of the communication apparatus H is stored is initialised to the "Inactive" state represented in the flow diagrams by the letter "Q". It should be stated in fact that a communication apparatus H considers itself as being in the "Inactive" state, symbolised by the letter "Q", at least until it transmits a first message, after a predetermined period without transmission. During the step 100, the register of the random access memory containing the identifier h is initialised to the value zero, which has the same meaning as the "inactive" state.

Then, in the course of the step 119, the counters Unoccupied_Channel_Period and Occupied_Channel_Period are stopped, which means that the registers of the random access memory storing them are no longer incremented.

The apparatus then performs the step 101 in the course of which the processor 10 reads the port 51 of the Wireless Module 50 so as to determine whether or not the transmission medium is occupied by the transmission of a message by another communication apparatus H'.

If so, the apparatus performs the step 102, which starts the Occupied_Channel_Period counter, that is to say initialises and starts incrementing a register of the random access memory by one unit at regular time intervals. And then the apparatus performs step 103 which entering the data reception phase, while processor 10 regularly reads the received data port 52 of the wireless module 50 in accordance with the counting by the clock 42.

During the step 104, as during the step 101, the processor 10 tests the occupation of the transmission medium. If the transmission medium is no longer occupied, the processor 10 performs the step 101.

If the result of the step 104 is positive, the processor performs a loop with the steps 104 to 107. During the step 105, the processor 10 will read the port 52 of the Wireless Module 50 and stores these data in the Received_Message register of the random access memory 44.

During the step 106, the processor 10 analyses the Received_Message check field (C) and determines if the messages were received correctly, according to error detection techniques known, moreover, to experts.

Figure 5B:
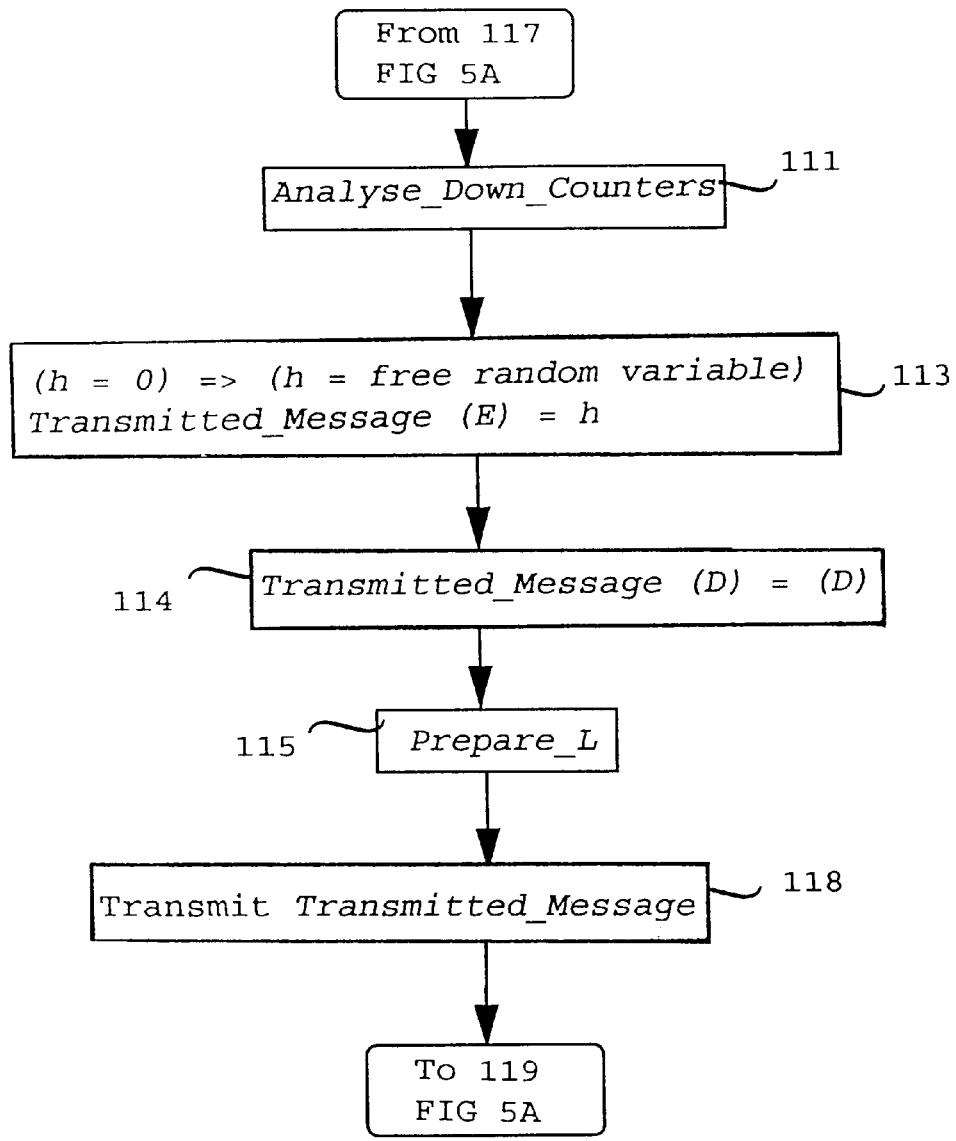
Figure 5C:
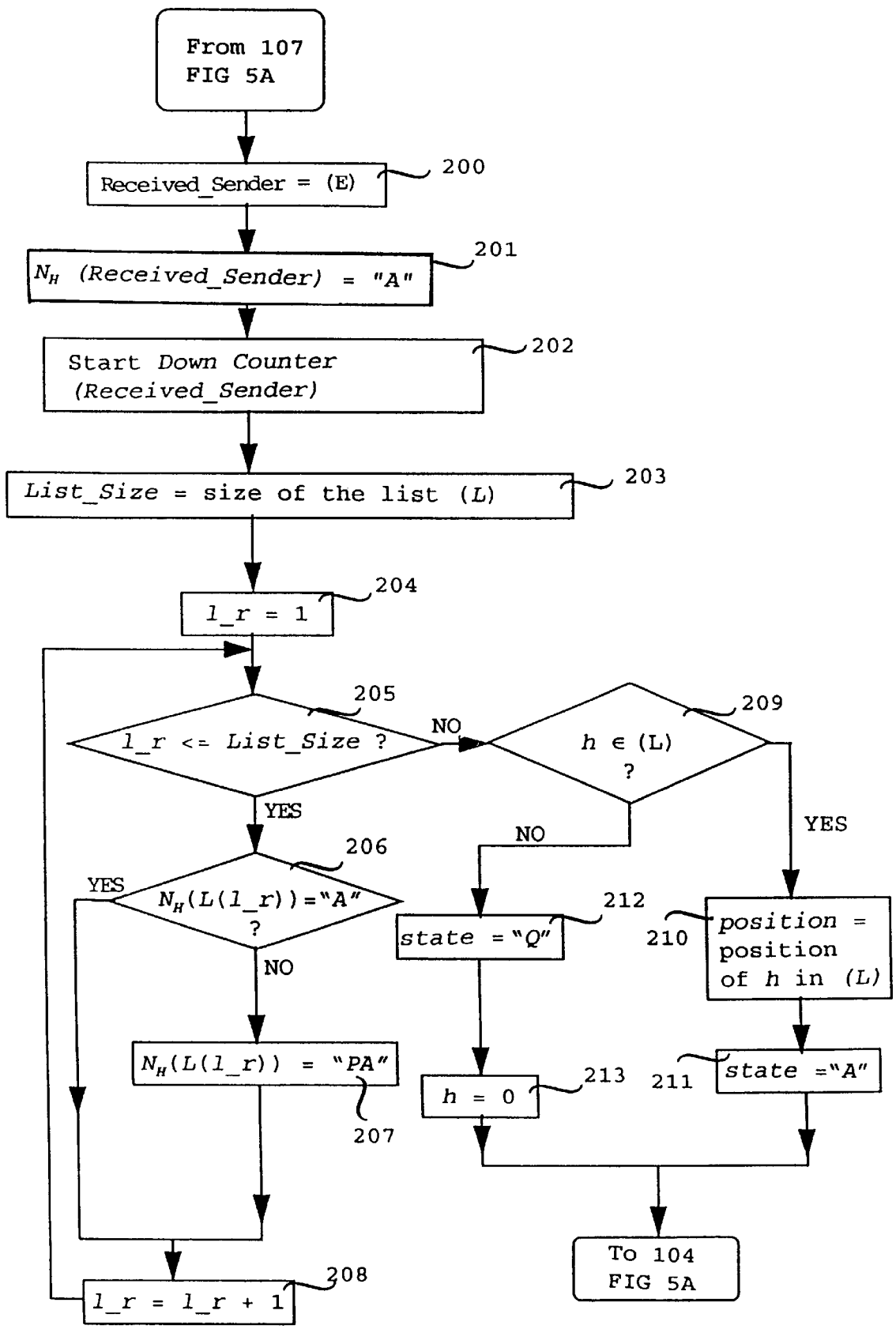
FIG. 5C is a flow diagram of a sub-program for analysis of messages correctly received.
Figure 5D:
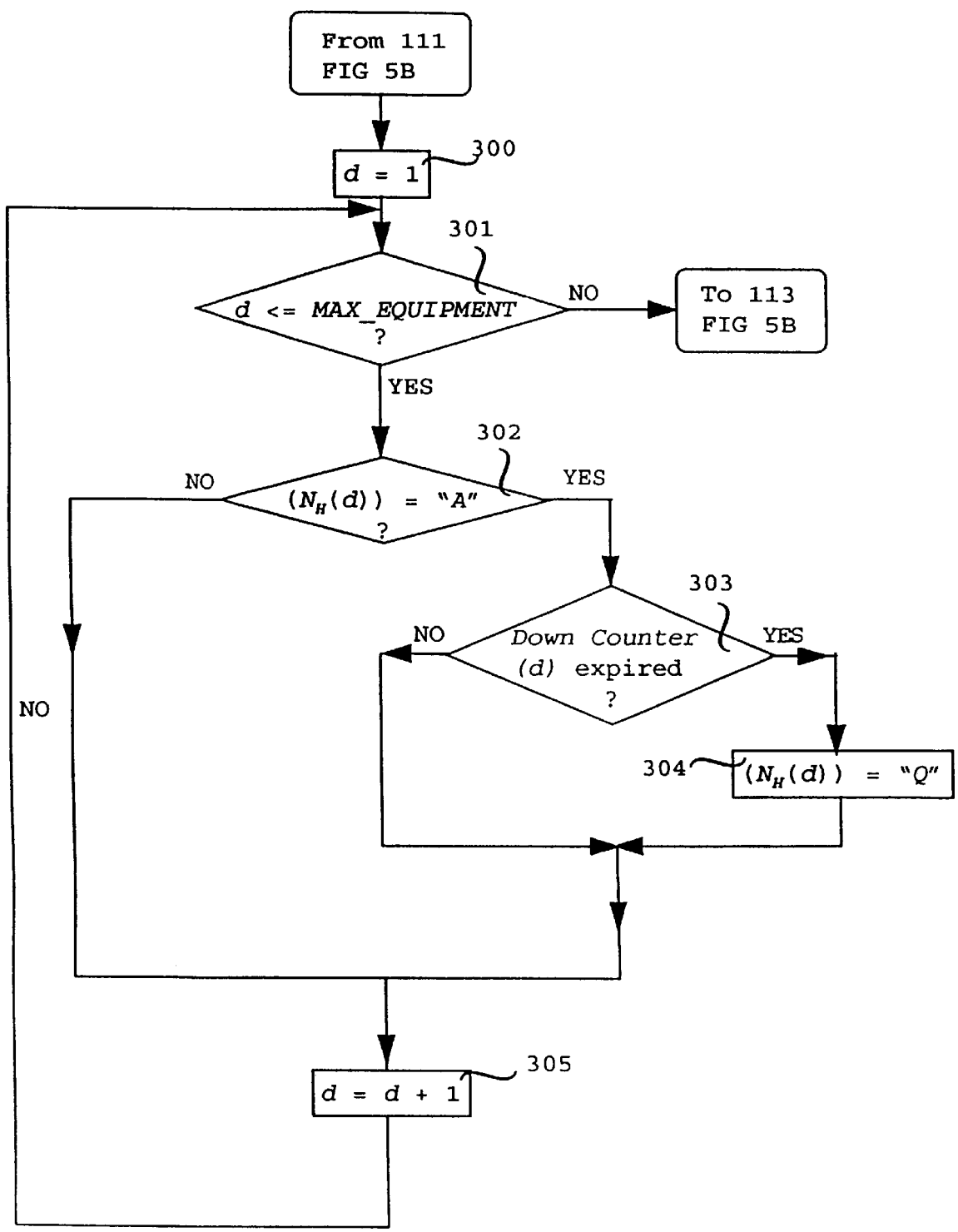
FIG. 5D is a flow diagram of a sub-program for analysis of various down counters.

If Received_Message is received correctly, the result of the step 106 being positive, the processor 10 performs the step 107 in the course of which it analyses various fields of Received_Message, using the sub-program in FIG. 5C.

On the basis of field analyses of the received messages in FIG. 5C, during the step 200 (FIG. 5C), the Received_Sender register of the random access memory 44 is modified and takes the value of the sender field (E) of Received_Message.

During the step 201, the processor 10 save the communication apparatus identified as <<active>> from the received messages in the activity state of the communication table $N_H$.

During the step 202, the down counter corresponding to Received_Sender is initialised to a value corresponding to the period $T_I$ and started, that is to say decremented at regular time intervals to reach the value zero when the said period $T_I$ has expired. In accordance with the clock 42, the processor 10 can thus hold the Received_Sender "Active" state in the table $N_H$ for the period $T_I$ determined by the initial value of Down counter(Received_Sender).

During the step 203, the register List_Size of the random access memory 44 will be initialized to the list size of the state field (L) of the message correctly received.

During the step 204, the register l_r of the random access memory 44 identifying the l_r-th element in the list in the Received_Message state field (L) is initialised to 1.

The processor 10 then starts the loop 205 to 208, in the course of which the Received_Message state field (L) is analyzed.

The step 205 determines whether the whole list in the state field (L) has been analyzed by determining whether or not the current value of l_r is less than or equal to the value of the variable List_Size. If the result of the step 205 is negative, the processor 10 performs the step 209.

If the result of the step 205 is positive, the step 206 determines whether or not the identifier corresponding to the l_r-th element of the state field (L) is recorded as "Active" in $N_H$. If the result of the step 206 is negative, the communication apparatus identified by L(l_r) changes to the "Presumed Active" state, which is brought about by modifying the record of L(l_r) in $N_H$ during the step 207.

The processor 10 then performs the step 208, during which the register containing the variable l_r is incremented.

Once the list in the Received_Message state field (L) has been fully analyzed, the result of step 205 is negative and the processor 10 performs the step 209. This test determines whether or not the value of the register of the random access memory 44 containing the identifier h of the communication apparatus H is contained in the list in the Received_Message state field (L). If the result of this step is positive, the processor 10 performs the step 210 during which it stores in the register position of the random access memory 44, the position of this identifier h in the state field (L). Finally, in the course of the step 211, the register state in which the state of the communication apparatus H is stored is modified to the value 'A' representing the state of an "Active" communication apparatus.

If the result of step 209 is negative, the processor 10 performs the step 212, in which the register state is modified to the value "Q" representing the state of an "Inactive" communication apparatus.

The processor 10 then performs the step 213 and identifies h equal to zero as identifier of the communication apparatus H.

At the conclusion of the steps 211 and 213, the Roceived_Message analysis sub-program is terminated and the processor 10 performs the step 104. When the transmission medium is no longer occupied, the processor 10 performs the step 108, during which the Unoccupied_Channel_Period counter is initialised to the value zero. In accordance with the clock 42, this counter counts the period of non-occupation of the transmission medium since the last transmission of a message.

During the step 110, it checks whether or not the transmission medium is occupied. If the transmission medium becomes occupied, the result of the step 110 is positive and the processor 10 performs the step 101. If the transmission medium is still not occupied, the processor 10 enters the loop 110 to 112, which it will leave if the transmission medium becomes occupied (step 110) or if the communication apparatus H has data to transmit (step 112).

When the communication apparatus H has data to transmit and the transmission medium is unoccupied, the result of the step 112 becomes positive.

The processor 10 then performs the step 109 which determines whether or not the value of the counter Unoccupied_Channel_Period is greater than the value of the variable $T_S$.

When the result of the step 109 is negative, the step 120 determines whether or not the value of the counter Occupied_Channel_Period is greater than the value of the variable $T_{MIN}$. When the result of the step 120 is negative, the processor 10 returns to the step 110. When the result of the step 120 is positive, the processor 10 performs the step 116.

Figure 5E:
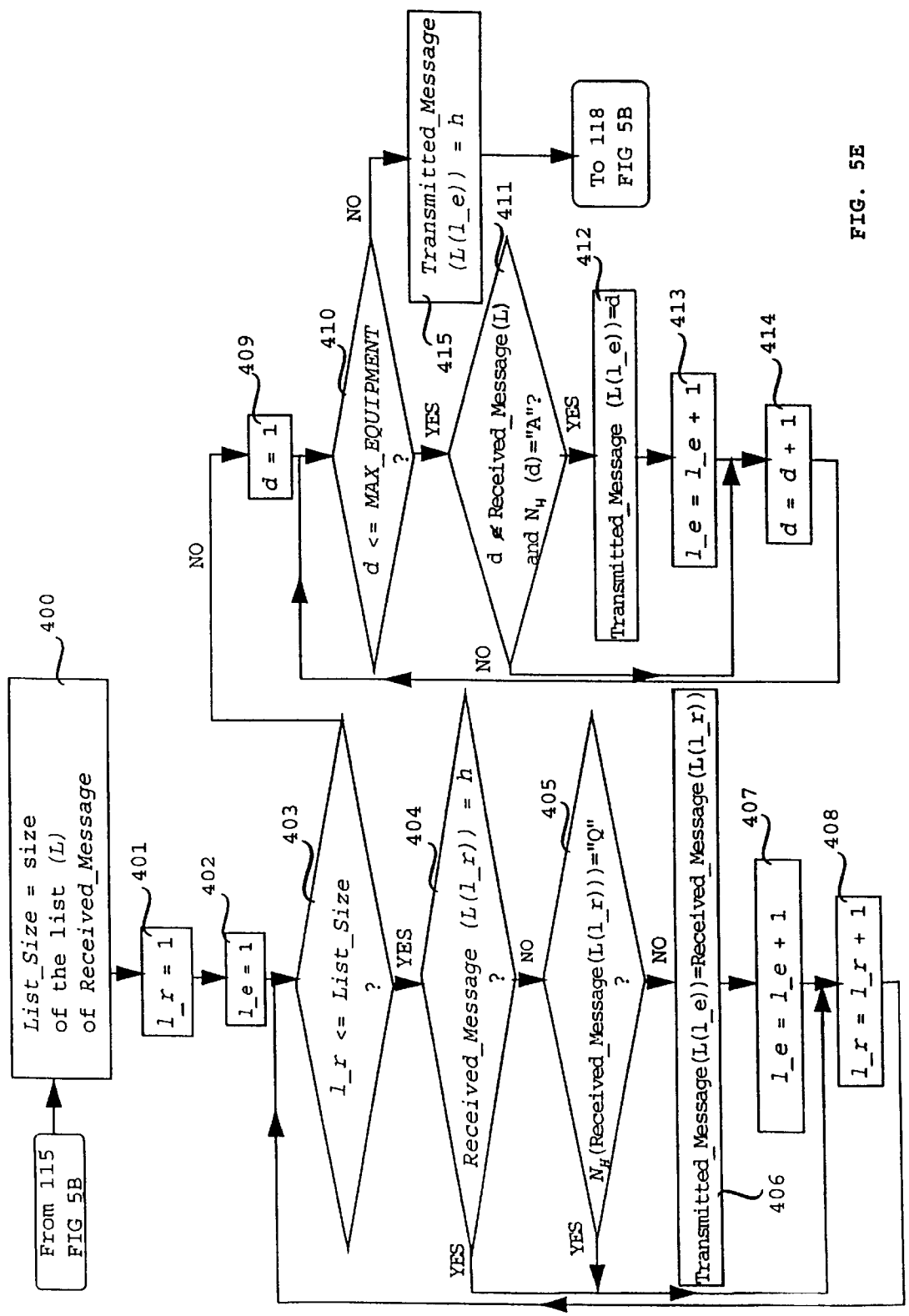
FIG. 5E is a flow diagram of a sub-program for preparation of a field (L) of a message transmitted by a communication apparatus.
Figure 5F:
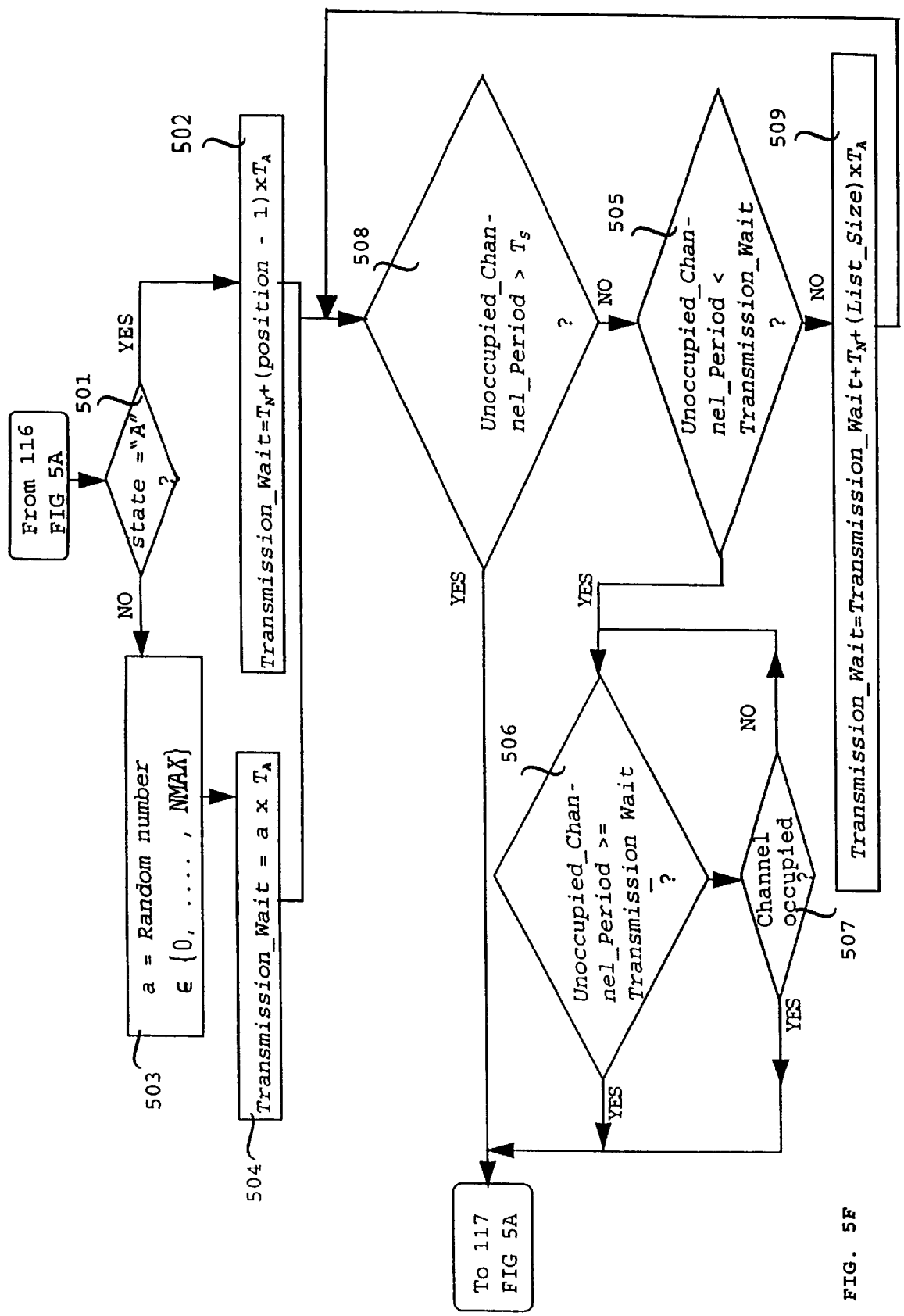
FIG. 5F is a flow diagram of a sub-program in the course of which a communication apparatus waits for a message transmission moment.

During the step 116, the communication apparatus H enters a sub-program of FIG. 5F which enables it to wait for the transmission start moment at which it can actually transmit Transmitted_Message. This sub-program is now described in conjunction with FIG. 5F.

During the step 501, the processor 10 checks whether the state of the communication apparatus H is "Active". If so, the processor 10 performs the step 502, during which the register Transmission Wait of the random access memory 44 takes as its value the period which the communication apparatus H has to wait before transmitting, a period counted from the moment when the transmission medium changed to the unoccupied state. In accordance with the particular embodiment of the invention, the transmission slot reserved for an "Active" communication apparatus is the nth period of duration $T_A$ counted from the end of the time interval of duration $T_N$ reserved for "Inactive" communication apparatuses where n is the position of the identifier of the communication apparatus H in the state field (L) of the last message correctly received by the communication apparatus H.

If the result of the step 501 is negative, the processor 10 performs the step 503 during which the communication apparatus H chooses a number at random between 0 and NMAX, this random number filling the register a of the random access memory 44.

The step 501 being negative, the communication apparatus H is "Inactive" and, in the course of the step 504, its transmission slot is the (a+1)th period of duration $T_A$ counted from the moment the transmission medium becomes unoccupied again.

At the conclusion of the steps 502 or 504, the processor 10 performs the step 508 in the course of which it determines whether or not the value of the counter Unoccupied_Channel_Period is greater than that of the variable $T_S$. If the result of the step 508 is negative, the step 505 is performed, in the course of which it is tested whether the communication apparatus H wishes to transmit after the transmission slot reserved for it. This step is performed by comparing the values of Unoccupied_Channel_Period, which contains the period which has elapsed since the transmission medium became unoccupied, with Transmission_Wait, containing the time envisaged for the transmission of Transmitted_Message.

If the result of the step 505 is negative, the processor 10 performs the step 509, during which the register of the random access memory 44 containing the value Transmission_Wait is incremented by a step of value $$T_N + (\text{List\_Size}) \times T_A$$

and then the processor 10 returns to the start of the step 508.

The loop comprising the steps 505, 508 and 509 therefore consists of choosing the next time slot authorised for transmission by the communication apparatus in question. Transmission_Wait takes the smallest suitable value greater than the period which has elapsed since the communication medium became unoccupied (Unoccupied_Channel_Period).

If the result of the step 505 is positive, the communication apparatus H enters a loop consisting of the negative outputs from two steps 506 and 507, in the course of which it waits for the transmission delay equal to the variable "Transmission_Wait". The processor 10 leaves this loop either at the end of this delay time (positive result of the step 506, which determines whether the delay which has actually elapsed is greater than or equal to the delay in the said register), or because the transmission medium becomes occupied again (positive result of the step 507, which determines whether the channel is occupied), and in both cases performs the step 117 FIG. 5A.

During the step 117 in FIG. 5A, the communication apparatus H is ready to transmit Transmitted_Message. In the course of this step, it determines whether the transmission medium is actually occupied or not. If this is the case, during the step 111 (FIG. 5B), the communication apparatus H analyses the different down counters. This is performed by the sub-program in FIG. 5D.

During the step 300 (FIG. 5D), the register of the random access memory 44 containing the number d of the current down counter is initialised to 1.

During the step 301, it is ensured whether the value of d is less or equal to that of MAX_EQUIPMENT within all the down counters. When all the down counters have been analyzed, the result of 301 is negative and the processor 10 performs the step 113 (FIG. 5B).

Otherwise, the processor 10 performs the step 302, during which the state $N_H(d)$ of the communication apparatus identified as d is tested. If the communication apparatus H considers this communication apparatus "Active", the processor 10 performs the step 303, during which it establishes, in accordance with the clock 42, whether Down_counter (d) is zero, which means that the period $T_I$ has expired. If the result of step 303 is positive, this means the communication apparatus H has not correctly received any message with the sender field (E) containing this identifier d during the period $T_I$ and during the step 304 its state changes to "Inactive", that is $N_H(d)$ takes the value "Q".

After the step 304, or if the steps 302 or 303 are negative, the processor 10 performs the step 305, during which the register d of the random access memory 44 is incremented by 1, and then returns to the step 301.

When the result of the step 301 becomes negative, the processor 10 then performs the step 113 in FIG. 5B during which the sender field (E) of the message Transmitted_Message which the communication apparatus H is preparing to transmit is filled with the value of the register "h" of the random access memory 44 containing the identifier of the communication apparatus H, unless this value is zero, in which case the communication apparatus chooses at random as its identifier a non-zero integer between 1 and NMAX inclusive which is neither in the state field of the last message received nor considered "active" in the table Nor and stores this identifier in the register h.

During the step 114, the Transmitted_Message data field (D) is filled with the data (D) which the communication apparatus H wishes to transmit.

During the step 115, the Transmitted_Message state field (D) is filled with the list of identifiers of the communication apparatuses of "Active" or "Presumed Active" states known to the communication apparatus H, namely the identifiers recorded as "A" or "PA" in $N_H$ followed by the identifier h itself. This is performed by the sub-program which will be described below in conjunction with FIG. 5E. It should be noted, preliminarily, that the steps 111 to 115 (FIG. 5B) are performed sufficiently rapidly, with respect to the elementary period $T_A$, for the communication apparatus in question to be still in its transmission slot at the end of the step 115.

During the step 400 in FIG. 5E, the register List_Size of the random access memory 44 takes the value of the size of the list in the Received_Message state field (L). During the step 401, the register l_r of the random access memory 44, containing the value of the l_r-th element of the list in the Received_Message state field (L) is initialised to 1, and during the step 402, the register l_e containing the value of the l_e-th element of the list in the Transmitted_Message state field (L) is initialised to 1.

The processor 10 then enters the loop 403 to 408, in the course of which the communication apparatus starts constructing the list in the Transmitted_Message state field (L) with the data contained in the list in the Received_Message state field (L).

The step 403 makes it possible to check whether the list in the Received_Message state field (L) has been processed in full by determining whether the value of the variable l_r is less than or equal to the value of the variable List_Size. So long as the list has not been processed in full, the result of the step 403 is positive and the processor 10 performs the step 404. In the step 404, if the current identifier contained in the list in the Received_Message state field (L) is the identifier h of the communication apparatus H, the processor 10 performs the step 408 during which the register l_r is incremented. Otherwise the processor 10 performs the step 405 of the state, inactive or otherwise, of the current identifier in the list in the Received_Message state field (L).

If this state is "inactive" (Q), the result of step 405 is positive and the processor 10 performs the step 408 previously described.

Otherwise, the state of the current communication apparatus is "Active" or "Presumed Active" (PA), the result of the step 405 is negative and, during the step 406, the element l_e of the list in the Transmitted_Message state field (L) is filled by this identifier. The processor 10 then performs the step 407 in the course of which the value contained in the register l_e is incremented, together with, during the step 408, that contained in the register l_r.

When the list in the Received_Message state field (L) has been processed in full, the result of the step 403 becomes negative and the processor 10 performs the step 409.

In the course of the steps 409 to 414, the communication apparatus H incorporates in the list in the Transmitted_Message state field (L) the identifiers of the "Active" communication apparatuses contained in $N_H$ and not belonging to the list in the Received_Message state field (L).

During the step 409, the register d of the random access memory 44 containing the rank of the current identifier in the table $N_H$ is initialised to 1. During the step 410, there is a check of whether the communication apparatus identified by communication apparatus H has been integrated to the list. If this is not the case, the result of the test 410 is positive and, in the course of the step 411, there is testing for whether both firstly the state of the current identifier is "Active" and secondly this identifier is absent from the list in the Received_Message state field (L). If the result of the step 411 is positive, during the step 412, the element of rank l_e in the list in the Transmitted_Message state field (L) is filled by the identifier d and the value contained in the register l_e is incremented in the course of the step 413 and then, during the step 414, that contained in the register d. If the result of the step 411 is negative, the step 414 is performed.

When the state of all the communication apparatuses has been tested, the result of the step 410 becomes negative. The processor 10 then performs the step 415 in the course of which the list in the Transmitted_Message state field (L) is terminated by the identifier of the communication apparatus H, namely h. On the basis of FIG. 5E, the sub-program for preparation of a message to be transmitted is then terminated and the processor 10 then performs the step 118 (FIG. 5B) in the course of which the message stored in the Transmitted_Message register is transmitted.

The processor 10 again performs, at the end of the step 118 in FIG. 5B or if the result of the step 117 is positive, the step 119 (FIG. 5A).

It should be noted that a communication apparatus which transmits a message receives it correctly or, at the very least, takes account of it as though it had received it correctly itself. In this way, when a communication apparatus is the first to transmit on the shared communication medium, the other communication apparatuses have allocated to them a reserved interval of time before the said first means to transmit again has, in its turn, an interval of time reserved for transmission.

The invention is not limited to the examples presented in relation to the figures, but on the contrary encompasses the modifications, variants and improvements within reach of the man of the art.

In particular, according to an advantageous variant, the identifiers used are universal addresses defined by the ETHERNET 802.3 Medium Access Control layer. It should be noted in relation to this that the identifier length used is, as it increases, on the one hand favourable for avoiding collisions due to two communication apparatuses simultaneously choosing one identifier, but, on the other hand, unfavourable in terms of the compactness of the messages transmitted. Experts will need to take account of this compromise in order to choose, in a determined or dynamic fashion, the family of identifiers to be used.

In particular, according to a variant, the "transmission start interval" $T_N$, which contains the duration of the time intervals reserved for equipment having an "inactive" activity state is the product of the elementary period $T_A$ and a number which is variable according to the number of communication apparatuses with an identifier present in the last message transmitted on the shared communication medium.

According to another variant, the time intervals are allocated according to predetermined rules, taking account of priorities to favour the communication apparatuses which are assumed to have most data to transmit.

According to another variant, each communication apparatus uses only certain of the activity states of the other communication apparatuses for determining at what moment it can transmit. According to this variant, some priority rules can in effect be fixed, to favour certain predetermined communication apparatuses or to favour communication apparatuses which have a high transmission requirement.

The apparatus according to the present invention can also be combined with a system for sharing a transmission medium in which an acknowledgement of message reception is produced by the communication apparatus, according to known techniques. It will be noted in this regard that such an acknowledgement can be performed by the upper layers of the network.

TABLE 1

|  | "Active" | "Presumed Active" | "Inactive" |
|---|---|---|---|
| at t reception with (E) = h' | "Active" until $t + T_I$ | "Active" until $t + T_I$ | "Active" until $t + T_I$ |
| at t reception with h' ∈ (L) | X | "Presumed Active" until reception of the next correct message | "Presumed Active" until reception of the next correct message |
| no reception with (E) = h' during $T_I$ | "Inactive" | X | X |
| reception with h' ∉ (L) | X | "Inactive" | X |

X : no effect on the state of the communication apparatus

What is claimed is:

1. Method for sharing a transmission medium between communication apparatuses having an identifier, each adapted on the one hand to transmit messages by means of the transmission medium, in the course of so-called "transmission" phases, and/or on the other hand to receive messages by means of the transmission medium, in the course of so-called "reception" phases, wherein each communication apparatus:

in each reception phase, stores, associated with identifiers, activity states representing the last messages transmitted by the communication apparatuses possessing these identifiers, in their own transmission phases; and in a so-called "transmission preparation" phase preceding each transmission phase, determines at what moment the communication apparatus which performed the reception phase can transmit a message on the transmission medium according to first predetermined rules taking account of at least one of the activity states it stored during the reception phase, the moment varying with the set of activity states stored during the reception phase.

2. Method according to claim 1, wherein the first predetermined rules include the fact that the communication apparatuses which have, as their own activity states, a predetermined activity state, can each transmit before the other communication apparatuses.

3. Method according to claim 2, wherein the first predetermined rules include the fact that the communication apparatuses which have a message to transmit and which have, as their own activity states, the predetermined activity state, wait for a random period, starting from the moment the transmission medium becomes unoccupied, before transmitting a message.

4. Method according to claim 3, wherein the first predetermined rules include the fact that the random period is equal to the product of the synchronization period of the communication apparatuses on the one hand and a random whole number determined by each of the communication apparatuses which has a message to send, on the other hand.

5. Method according to claim 2, wherein the first predetermined rules include the fact that, if the transmission medium has remained unoccupied for a predetermined period, each communication apparatus can transmit without waiting.

6. Method according to claim 1, wherein in the message reception phase of each communication apparatus, the communication apparatus performs an operation of updating the activity states, according to second predetermined rules.

7. Method according to claim 6, wherein the second predetermined rules include the fact that the activity state of a communication apparatus which transmits a message is "active" for all communication apparatuses correctly receiving this message.

8. Method according to claim 7, wherein the second predetermined rules include the fact that, at the end of a predetermined period ($T_I$), if a first communication apparatus does not correctly receive a message from a second communication apparatus to which the first communication apparatus has allocated an "active" activity state, the activity state allocated by the first communication apparatus to the second communication apparatus is no longer "active".

9. Method according to claim 1, wherein in the transmission preparation phase of each communication apparatus, the communication apparatus performs an operation of inserting, into the message to be transmitted, a state field (L) representing at least some of the activity states stored by the communication apparatus in the course of the reception phase, according to further predetermined rules.

10. Method according to claim 9, wherein the further predetermined rules include the fact that the inserted state field (L) includes the identifiers of communication apparatuses which correspond to "active" activity states stored by the communication apparatus which performs the insertion operation, each of the "active" activity states corresponding to the correct reception of a message coming from a respective one of the communication apparatuses identified by the identifiers, over a predetermined period.

11. Method according to claim 9, wherein the first predetermined rules include the fact that the communication apparatuses whose identifiers are in the state field (L) can transmit in the order of their respective identifiers in the state field (L).

12. Method according to claim 9, wherein the further predetermined rules include the fact that the inserted state field (L) includes the identifier of the communication apparatus which inserts the state field (L).

13. Method according to claim 9, wherein in the message reception phase of each communication apparatus, the communication apparatus performs an operation of updating the activity states according to the state field (L) present in received messages, according to other predetermined rules.

14. Method according to claim 13, wherein the other predetermined rules include the fact that the identifiers present in the state field (L) and which, for the communication apparatus which receives the message, are not assigned an "active" activity state, are assigned a "presumed active" activity state corresponding to an incorrect reception of messages coming from the communication apparatuses corresponding to the identifiers, over a predetermined period.

15. Method according to claim 14, wherein the further predetermined rules include the fact that the inserted state field (L) includes the identifiers of the communication apparatuses for which the activity states stored by the communication apparatus performing the insertion operation are "active" or "presumed active".

16. Method according to claim 14, wherein the other predetermined rules include the fact that, when an identifier whose activity state stored by a communication apparatus is "presumed active" is absent from a state field (L), the activity state becomes "inactive".

17. Method according to claim 1, wherein in the transmission preparation phase of each communication apparatus, the communication apparatus performs an operation for determining an identifier which is capable of being specific to it, according to further predetermined rules, as a function of its own activity state and other activity states.

18. Method according to claim 17, wherein the further predetermined rules include the fact that, in the transmission preparation phase of each communication apparatus, the communication apparatus performs an operation of inserting, into the message to be transmitted, a state field (L) representing at least some of the activity states stored by the communication apparatus in the course of the reception phase, according to other predetermined rules, and that, if the identifier of a communication apparatus which receives the message is absent from the state field (L), the latter communication apparatus takes a predetermined identifier as its identifier.

19. Method according to claim 18, wherein the further predetermined rules include the fact that, to transmit, a communication apparatus which has the predetermined identifier chooses at random an identifier which is different from the predetermined identifier and different from the identifiers already allocated to other communication apparatuses.

20. Communication apparatus for communicating on a transmission medium, said communication apparatus including a memory which stores an identifier capable of being specific to it, means for transmitting messages by means of the transmission medium, and means for receiving messages by means of the transmission medium, and said communication apparatus comprising:

a random access memory storing a list of activity states associated with identifiers of other communication apparatuses, the activity states representing the latest messages transmitted by the other communication apparatuses; and means for processing the activity states which determines at what moment the communication apparatus which includes said memory can transmit a message on the transmission medium according to first predetermined rules taking account of at least one of the activity states stored in said random access memory, the moment varying with the set of activity states stored in said random access memory.

21. Communication apparatus according to claim 20, wherein the processing means is adapted to determine, according to the first predetermined rules, that the communication apparatuses which have, as their own activity states, a predetermined activity state, can each transmit before the other communication apparatuses.

22. Communication apparatus according to claim 20, wherein the processing means is adapted to determine, according to the first predetermined rules, that the communication apparatuses which have a message to transmit and which have, as their own activity states, the predetermined activity state, wait for a random period, starting from the moment the transmission medium becomes unoccupied, before transmitting a message.

23. Communication apparatus according to claim 22, wherein it includes a means for generating random whole numbers and the processing means is adapted to determine, according to the first predetermined rules, that the random period is equal to the product of the synchronization period of the communication apparatuses and a random whole number generated by the random whole number generation means.

24. Communication apparatus according to claim 20, wherein the processing means is adapted to determine, according to the first predetermined rules, that if the transmission medium has remained unoccupied for a predetermined period, each communication apparatus can transmit without waiting.

25. Communication apparatus according to claim 20, wherein it includes a means for updating the activity states stored in said random access memory, according to second predetermined rules.

26. Communication apparatus according to claim 25, wherein the updating means is adapted, according to the second predetermined rules, to allocate an "active" activity state to another communication apparatus from which a message is correctly received by the message receiving means.

27. Communication apparatus according to claim 26, wherein it includes a means for measuring a period which has elapsed since the receiving means correctly received a message from another communication apparatus whose activity state is "active", and wherein the updating means is adapted, according to the second predetermined rules, to allocate an activity state other than the "active" state when the period is greater than or equal to a predetermined period $(T_I)$.

28. Communication apparatus according to claim 20, wherein it includes a means for inserting, according to further predetermined rules, in the message to be transmitted, a state field (L) representing at least some of the activity states stored by said communication apparatus.

29. Communication apparatus according to claim 28, wherein it includes a means for measuring a period which has elapsed since the receiving means correctly received a message from another communication apparatus, and wherein the inserting means is adapted, according to the further predetermined rules, to insert a state field (L) which includes the identifiers of the communication apparatuses for which the activity state is "active", the "active" activity state corresponding to a case in which the measured period is less than a predetermined period ($T_r$).

30. Communication apparatus according to claim 28, wherein the processing means is adapted to determine, according to the first predetermined rules, that the moment at which the communication apparatus can transmit depends on the position of the identifier of said communication apparatus in the state field (L).

31. Communication apparatus according to claim 28, wherein the inserting means is adapted, according to the further predetermined rules, to insert a state field (L) which includes the identifier of the communication apparatus which inserts the state field (L).

32. Communication apparatus according to claim 28, wherein it includes a means for updating the list of activity states which allocates activity states to the communication apparatuses according to the state field (L) present in received messages, according to other predetermined rules.

33. Communication apparatus according to claim 32, wherein it includes, for other communication apparatuses, a means for measuring a period which has elapsed since the receiving means correctly received a message from one of the other communication apparatuses, and wherein the updating means is adapted, according to the other predetermined rules, to allocate a "presumed active" activity state to each communication apparatus which has an identifier present in the state field (L) and which is not assigned an "active" activity state, the "presumed active" activity state corresponding to a case in which the measured period is less than a predetermined period ($T_f$).

34. Communication apparatus according to claim 33, wherein the inserting means is adapted, according to the further predetermined rules, to insert a state field (L) which includes the identifiers of the communication apparatuses for which the activity states stored by the communication apparatus performing the insertion operation are "active" or "presumed active".

35. Communication apparatus according to claim 33, wherein the updating means is adapted, according to the further predetermined rules, to allocate an "inactive" activity state to an identifier whose activity state stored by the random access memory is "presumed active" and which is absent from a state field (L) inserted into a last message received correctly by the message receiving means.

36. Communication apparatus according to claim 20, wherein it includes a means for determining an identifier which is capable of being specific to it, according to further predetermined rules, as a function of its own activity state and other activity states.

37. Communication apparatus according to claim 36, wherein it includes an insertion means adapted to insert into the message to be transmitted a state field (L) representing at least some of the activity states stored by said communication apparatus in the course of a reception phase, according to other predetermined rules, and wherein if the preceding identifier of said communication apparatus is absent from the state field (L) of a message received by the receiving means, the means for determining an identifier is adapted, according to the further predetermined rules, to take a predetermined identifier as its identifier.

38. Communication apparatus according to claim 37, characterised in that the means for determining an identifier is adapted, according to the further predetermined rules, when the communication apparatus is to transmit a message and if the previous identifier of this means is the predetermined identifier, to choose at random an identifier which is different from the predetermined identifier, different from the identifiers which are present in the state field (L) of a last message which the receiving means has received correctly, and different from the identifiers stored by the random access memory in the list of activity states associated with identifiers of other communication apparatuses, the activity states representing the last messages transmitted by these other communication apparatuses.

39. Communication apparatus according to claim 20, wherein it includes a wireless communication module.

40. A Communication system that includes at least one communication apparatus for communicating on a transmission medium, said communication apparatus including a memory which stores an identifier capable of being specific to it, means for transmitting messages by means of the transmission medium, and means for receiving messages by means of the transmission medium, said communication apparatus also comprising:

a random access memory storing a list of activity states associated with identifiers of other communication apparatuses, the activity states representing the latest messages transmitted by the other communication apparatuses; and means for processing the activity states which determines at what moment the communication apparatus which includes said memory can transmit a message on the transmission medium according to first predetermined rules taking account of at least one of the activity states stored in said random access memory, the moment varying with the set of activity states stored in said random access memory.

41. A Communication system that implements a method of sharing a transmission medium between communication apparatuses of the system having an identifier, each communication apparatus being adapted on the one hand to transmit messages by means of the transmission medium, in the course of so-called "transmission" phases, and/or on the other hand to receive messages by means of the transmission medium, in the course of so-called "reception" phases, wherein in accordance with the method, each communication apparatus:

in each reception phase, stores, associated with identifiers, activity states representing the last messages transmitted by the communication apparatuses possessing these identifiers, in their own transmission phases; and in a so-called "transmission preparation" phase preceding each transmission phase, determines at what moment the communication apparatus which performed the reception phase can transmit a message on the transmission medium according to first predetermined rules taking account of at least one of the activity states it stored during the reception phase, the moment varying with the set of activity states stored during the reception phase.

42. A communication apparatus capable of communicating with a first communication apparatus, comprising: identifying means for identifying an activity state of said communication apparatus in accordance with information received from the first communication apparatus, the information including state information indicating the activity state of said communication apparatus; transmitting means for transmitting a message at the timing determined on the activity state identified by said identifying means.

43. A communication apparatus according to claim 42, wherein, said identifying means identify the activity state of a second communication apparatus in accordance with the information received from said first communication apparatus.

44. A communication apparatus according to claim 43, wherein, said identifying means identify the first communication apparatus which transmits the information as a third state and the second communication apparatus as a fourth state.

45. A communication apparatus according to claim 42, wherein, said transmitting means transmit the message including the activity state of the second communication apparatus identified by said identifying means.

46. A communication apparatus according to claim 42, wherein, said transmitting means transmit the message including the activity state of said communication apparatus identified by said identifying means.

47. A communication apparatus according to claim claim 42, wherein, said identifying means identify the activity state of the communication apparatus by the comprise of an identification.

48. A communication apparatus used in a communication system that includes a plurality of communication apparatuses, in which at least one of the plurality of communication apparatuses communicates information identifying an activity state of the at least one communication apparatus to a first communication apparatus of the plurality of communication apparatuses, said communication apparatus comprising:

identifying means for identifying activity states of the at least one communication apparatus and the first communication apparatus in accordance with information received by said communication apparatus from the first communication apparatus; and transmitting means for systematically transmitting information indicating the activity states of communication apparatuses whose activity states are identified by said identifying means, wherein an activity state of a communication apparatus represents a period that has elapsed since the communication apparatus is considered to have transmitted a message.

49. A communication apparatus according to claim 48, wherein, said identifying means identifies an activity state of a second communication apparatus of the plurality of communication apparatuses in accordance with the information received by said communication apparatus from the first communication apparatus.

50. A communication apparatus used in a communication system that includes a plurality of communication apparatuses, in which at least one of the plurality of communication apparatuses communicates information identifying an activity state of the at least one communication apparatus to a first communication apparatus of the plurality of communication apparatuses, said communication apparatus comprising:

identifying means for identifying activity states of the at least one communication apparatus and the first communication apparatus in accordance with information received by said communication apparatus from the first communication apparatus; and transmitting means for transmitting information indicating the activity states of communication apparatuses whose activity states are identified by said identifying means, wherein said transmitting means transmits the information at a timing in accordance with an activity state of at least one of the communication apparatuses identified by said identifying means.

51. A communication apparatus used in a communication system that includes a first plurality of communication apparatuses, said communication apparatus comprising:

storing means for storing a respective activity state for each of the first plurality of communication apparatuses, wherein an activity state of a communication apparatus represents a period that has elapsed since the communication apparatus is considered to have transmitted a message;

receiving means for receiving, from at least two of the first plurality of communication apparatuses, information including the respective activity states of a second plurality of communication apparatuses which are part of the first plurality of communication apparatuses;

updating means for updating the respective activity states of the second plurality of communication apparatuses based on the received information; and sending means for sending information including the respective activity states of the second plurality of communication apparatuses updated by said updating means to at least two of the first plurality of communication apparatuses.

* * * * *